US010348710B2

(12) United States Patent
Takae et al.

(10) Patent No.: US 10,348,710 B2
(45) Date of Patent: Jul. 9, 2019

(54) INFORMATION PROCESSING APPARATUS, COMMUNICATION SYSTEM AND CONTROL METHOD FOR PROVIDING COMMUNICATION SERVICES TO A COMMUNICATION APPARATUS

(71) Applicant: SONY CORPORATION, Tokyo (JP)

(72) Inventors: Shinji Takae, Tokyo (JP); Katsutoshi Itoh, Tokyo (JP); Masanori Sato, Tokyo (JP)

(73) Assignee: SONY CORPORATION, Tokyo (JP)

( * ) Notice: Subject to any disclaimer, the term of this patent is extended or adjusted under 35 U.S.C. 154(b) by 235 days.

(21) Appl. No.: 15/188,062

(22) Filed: Jun. 21, 2016

(65) Prior Publication Data

US 2016/0373426 A1 Dec. 22, 2016

Related U.S. Application Data

(63) Continuation of application No. 14/234,863, filed as application No. PCT/JP2012/068188 on Jul. 18, 2012, now Pat. No. 9,414,346.

(30) Foreign Application Priority Data

Aug. 12, 2011 (JP) ................................ 2011-176657

(51) Int. Cl.
*H04L 29/06* (2006.01)
*H04W 88/08* (2009.01)
(Continued)

(52) U.S. Cl.
CPC .......... *H04L 63/08* (2013.01); *H04L 63/0853* (2013.01); *H04L 63/10* (2013.01);
(Continued)

(58) Field of Classification Search
None
See application file for complete search history.

(56) References Cited

U.S. PATENT DOCUMENTS 7,415,537 B1* 8/2008 Maes ................ G06F 17/30905
707/999.01
8,228,870 B1 7/2012 Sigg et al.
(Continued)

FOREIGN PATENT DOCUMENTS

CN 102047629 A 5/2011
JP 2003-179648 A 6/2003
(Continued)

OTHER PUBLICATIONS

Office Action received for Japanese Patent Application No. 2011-176657, dated Aug. 18, 2015, 5 pages.
(Continued)

*Primary Examiner* — Saleh Najjar
*Assistant Examiner* — Michael W Chao
(74) *Attorney, Agent, or Firm* — Chip Law Group

(57) ABSTRACT

An information processing apparatus including a determination unit which determines whether a predetermined condition for performing communication processing between an information processing system relating to a service provider and a wireless communication apparatus is satisfied, and a control unit which sets a connection right to connect to a predetermined network using wireless communication for the wireless communication apparatus, and performs control in a manner that the wireless communication apparatus connects to the network based on the set connection right and performs the communication processing with the information processing system, when the predetermined condition is satisfied.

13 Claims, 13 Drawing Sheets

(51) Int. Cl.
  *H04W 12/08* (2009.01)
  *H04W 60/00* (2009.01)
  *H04W 8/18* (2009.01)
  *H04W 8/20* (2009.01)
  *H04W 4/70* (2018.01)
  *H04W 76/10* (2018.01)
  *H04L 29/08* (2006.01)

(52) U.S. Cl.
  CPC .......... *H04L 63/105* (2013.01); *H04L 63/108* (2013.01); *H04W 4/70* (2018.02); *H04W 8/183* (2013.01); *H04W 8/205* (2013.01); *H04W 12/08* (2013.01); *H04W 60/00* (2013.01); *H04W 76/10* (2018.02); *H04W 88/08* (2013.01); *H04L 67/34* (2013.01)

(56) References Cited

U.S. PATENT DOCUMENTS

| | | | |
|---|---|---|---|
| 8,332,464 B2* | 12/2012 | Dispensa | H04L 29/12009 709/203 |
| 2005/0124338 A1 | 6/2005 | Benco et al. | |
| 2005/0204050 A1* | 9/2005 | Turley | H04L 63/0263 709/229 |
| 2007/0100651 A1* | 5/2007 | Ramer | G06Q 20/16 705/37 |
| 2007/0214265 A1* | 9/2007 | Zampiello | H04L 67/1002 709/226 |
| 2008/0271120 A1* | 10/2008 | Parkes | H04L 63/101 726/3 |
| 2009/0217348 A1 | 8/2009 | Salmela et al. | |
| 2009/0217364 A1 | 8/2009 | Salmela et al. | |
| 2010/0263022 A1* | 10/2010 | Wynn | H04W 12/06 726/3 |
| 2011/0258303 A1* | 10/2011 | Nath | G06F 9/468 709/223 |
| 2011/0302643 A1* | 12/2011 | Pichna | H04L 63/0892 726/7 |
| 2012/0002594 A1* | 1/2012 | Racz | H04B 7/15557 370/315 |
| 2012/0178418 A1* | 7/2012 | Yu | H04W 4/60 455/411 |
| 2012/0210011 A1* | 8/2012 | Liu | H04L 63/10 709/229 |
| 2012/0240197 A1* | 9/2012 | Tran | H04L 63/1416 726/4 |
| 2012/0244858 A1* | 9/2012 | Skog | H04W 8/26 455/432.1 |
| 2012/0289193 A1* | 11/2012 | Bergenwall | H04W 4/60 455/410 |
| 2013/0121483 A1* | 5/2013 | Murakami | H04M 1/72519 379/212.01 |
| 2013/0148585 A1* | 6/2013 | Ohlsson | H04L 61/3095 370/328 |
| 2013/0208703 A1* | 8/2013 | Sugimoto | H04L 12/66 370/331 |
| 2013/0326603 A1* | 12/2013 | Kato | H04W 12/04 726/6 |
| 2014/0162622 A1* | 6/2014 | Oda | H04W 4/08 455/419 |
| 2014/0196127 A1* | 7/2014 | Smeets | H04L 63/0815 726/5 |
| 2016/0156719 A1* | 6/2016 | Mobarak | H04L 67/141 726/4 |

FOREIGN PATENT DOCUMENTS

| | | | |
|---|---|---|---|
| JP | 2008-011416 A | | 1/2008 |
| JP | 2010-532107 A | | 9/2010 |
| JP | 2011-510571 A | | 3/2011 |
| JP | 2012-520026 A | | 8/2012 |
| WO | 2009/092115 A | | 7/2009 |
| WO | 2009092115 A2 | | 7/2009 |

OTHER PUBLICATIONS

3rd Generation Partnership Project, "Technical Specification Group Service and System Aspects; Feasibility Study on the Security Aspect of Remote Provisioning and Change of Subscription for Machine to Machine (M2M) Equipment", 3GPP Standard; 3GPP TR 33.812, Mobile Competence Centre; 650, Route Des Lucioles; F-06921 Sophia-Antipolis Cedex; France, No. V9.2.0, Jun. 22, 2010, pp. 1-87.

Extended European Search Report for EP Patent Application No. 12823960.5 dated Feb. 9, 2015, 8 pages.

Office Action for Cn Patent Application No. 201280038341/, issued on Feb. 22, 2017, 08 pages Of Office Action and 10 pages Of English Translation.

* cited by examiner

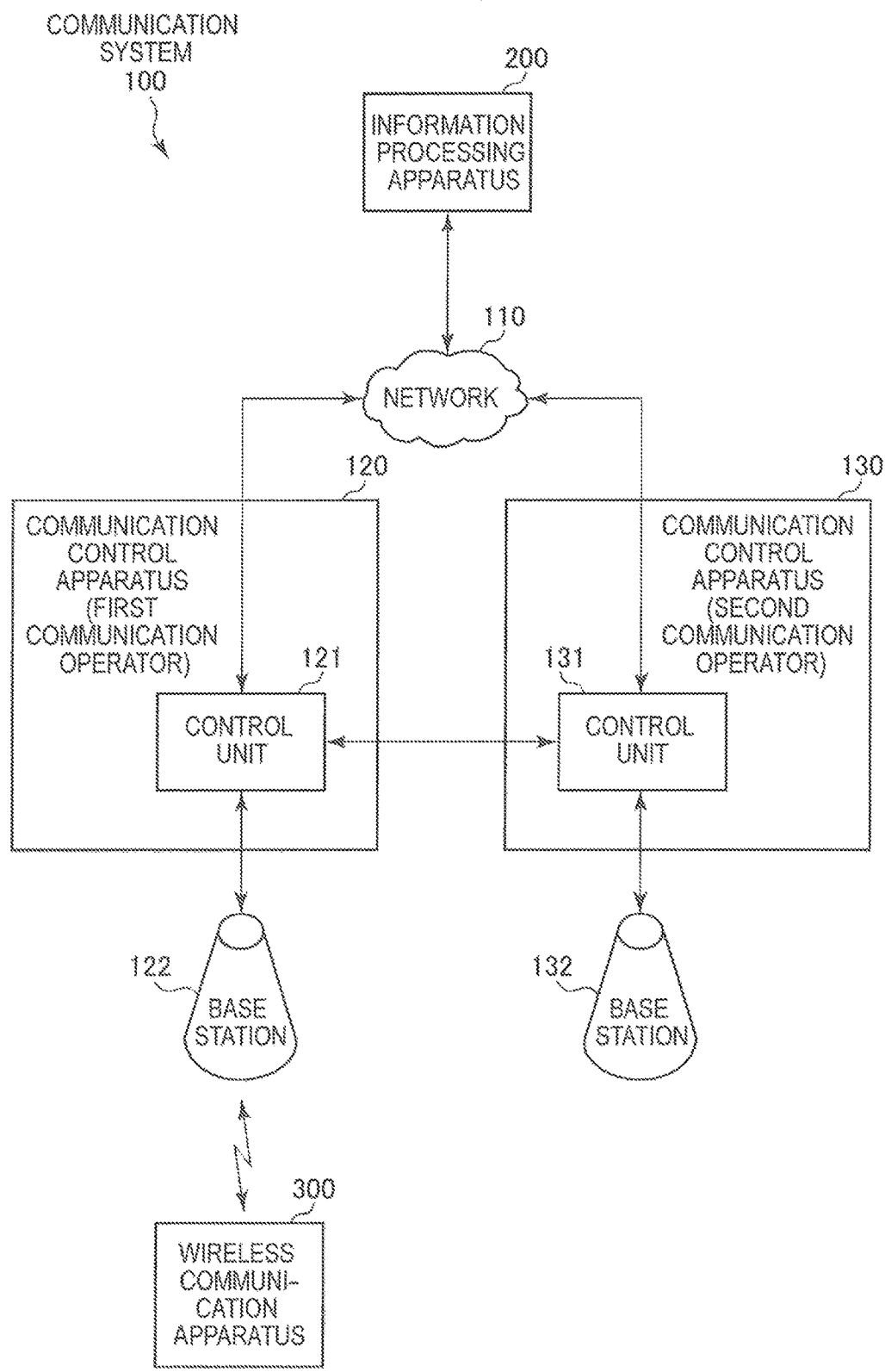

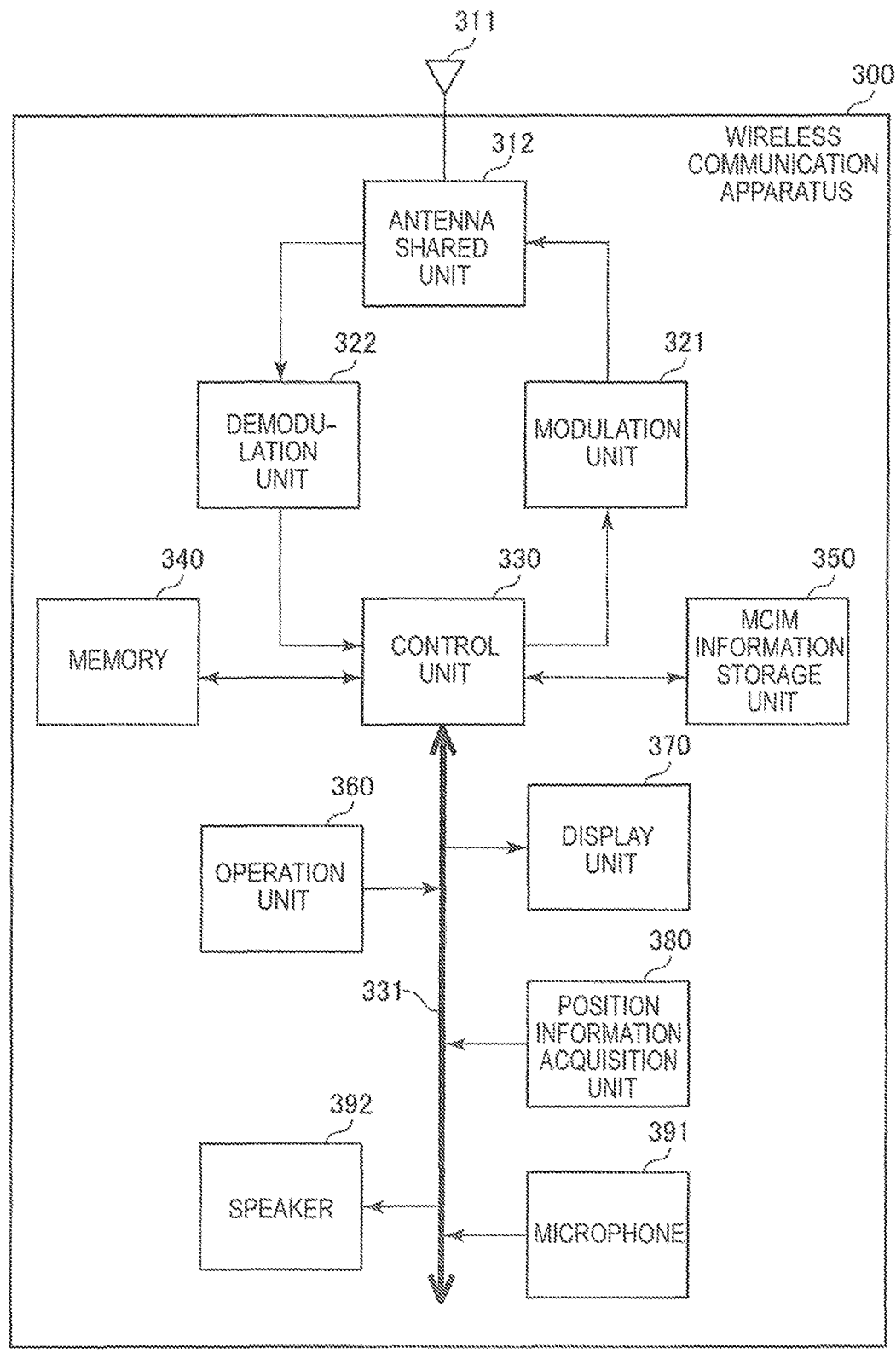

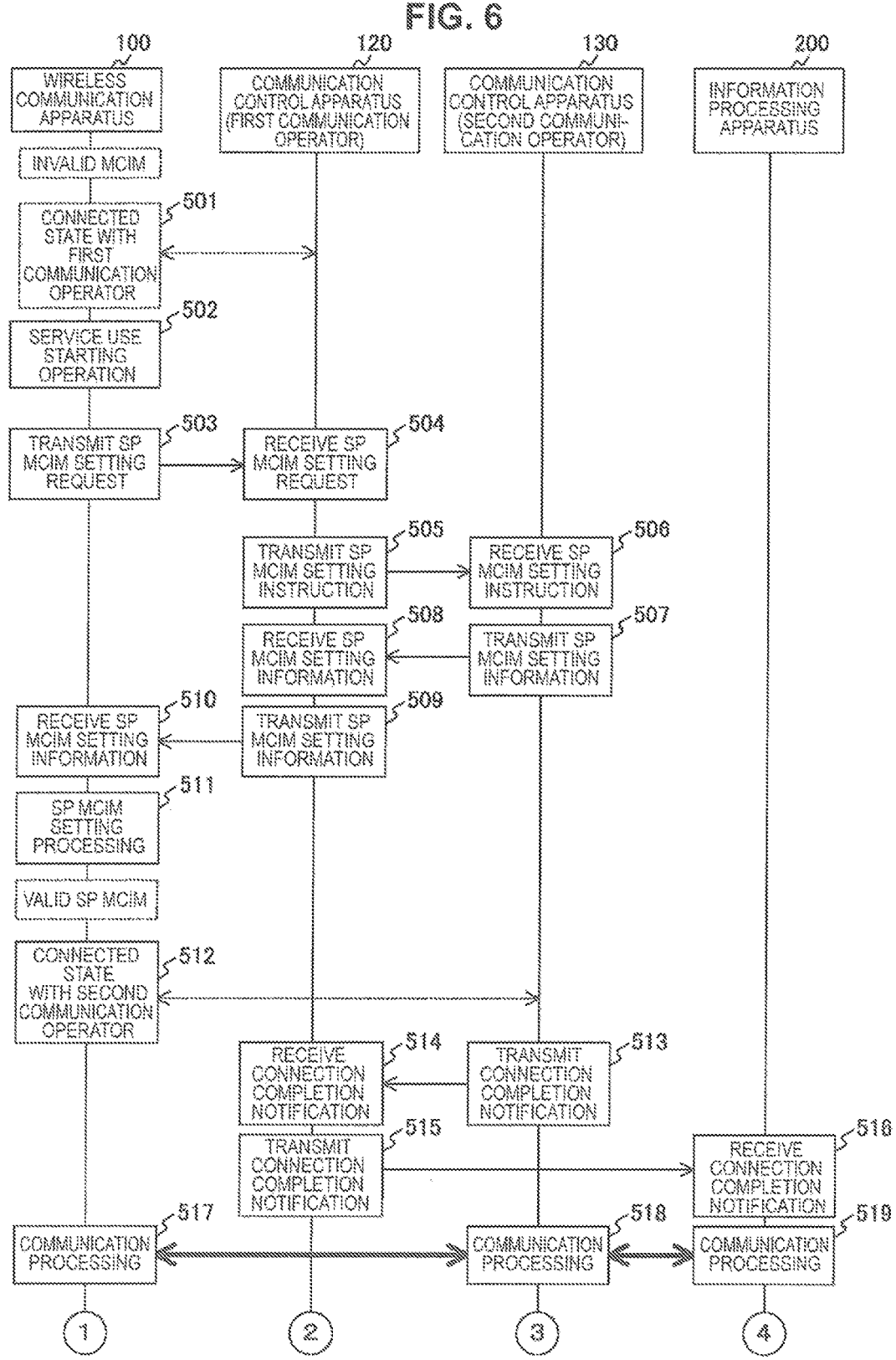

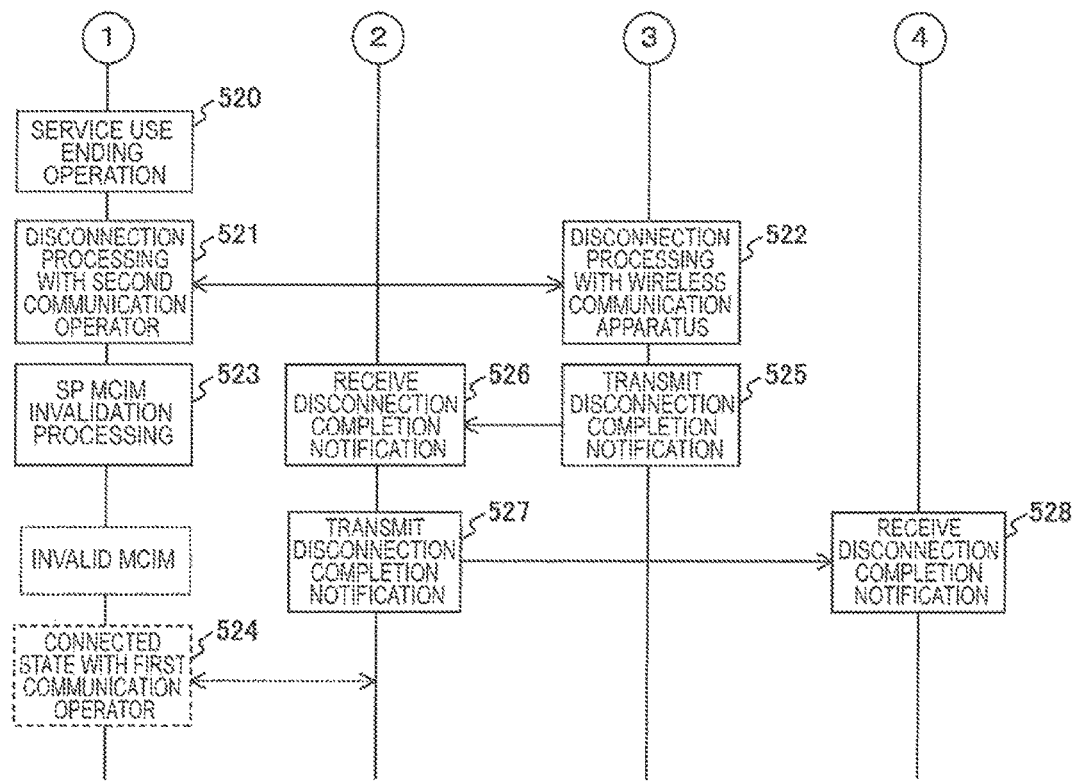

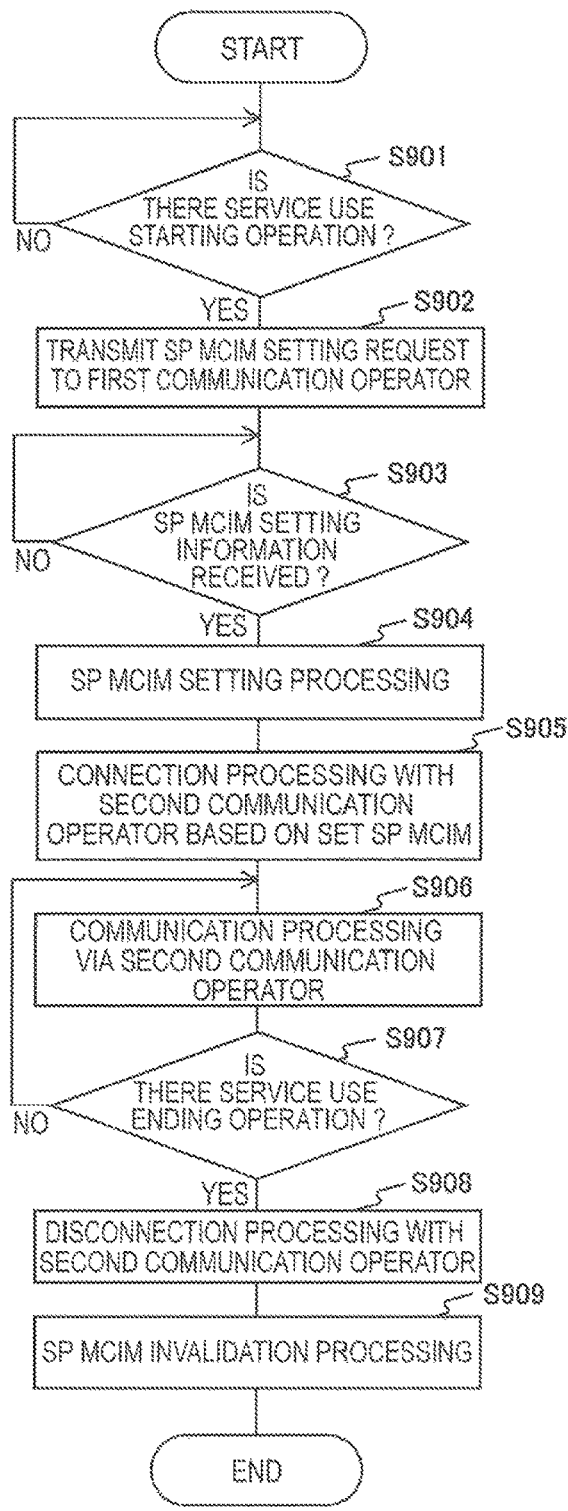

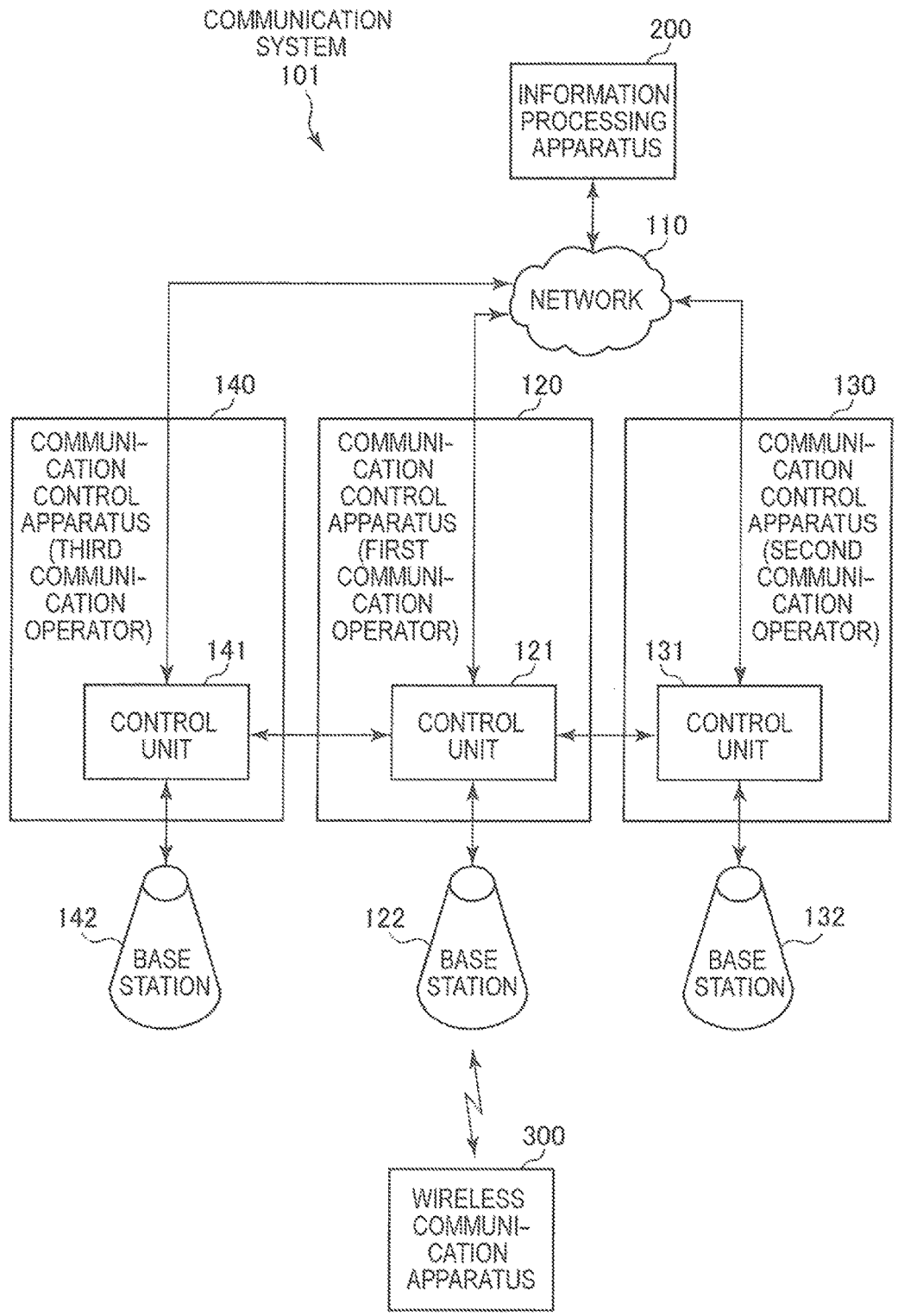

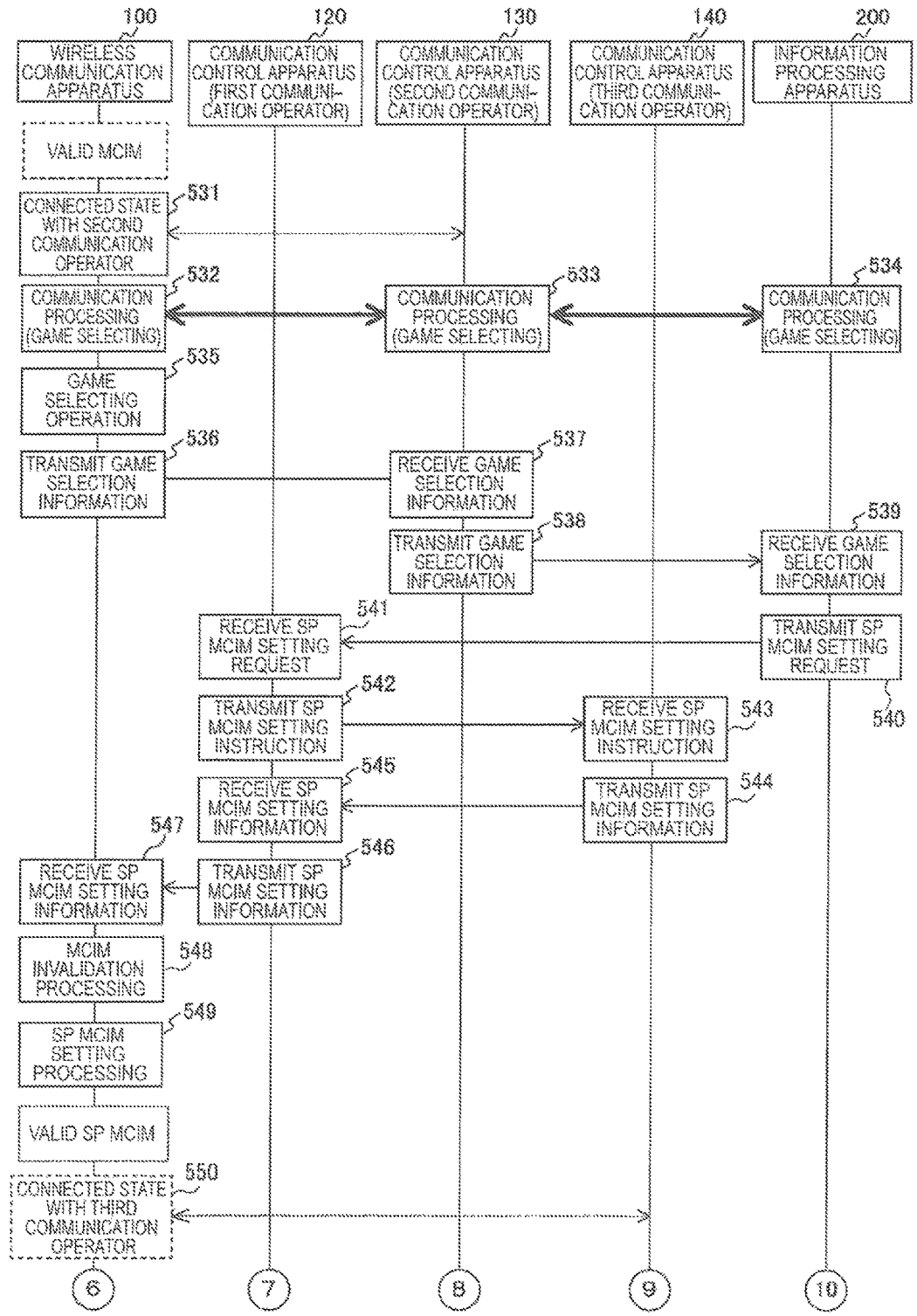

OPERATIONAL EXAMPLE OF INFORMATION PROCESSING APPARATUS
(SERVICE PROVIDING COMPANY)

INFORMATION PROCESSING APPARATUS, COMMUNICATION SYSTEM AND CONTROL METHOD FOR PROVIDING COMMUNICATION SERVICES TO A COMMUNICATION APPARATUS

CROSS REFERENCE TO RELATED APPLICATIONS

The present application is a continuation application of U.S. patent application Ser. No. 14/234,863, filed Jan. 24, 2014, which is a National Stage of PCT/JP2012/068188, filed Jul. 18, 2012, and claims the priority from prior Japanese Priority Patent Application JP 2011-176657 filed in the Japan Patent Office on Aug. 12, 2011, the entire content of which is hereby incorporated by reference.

TECHNICAL FIELD

The present technology relates to an information processing apparatus. More specifically, the present technology relates to an information processing apparatus connected to a network, a communication system including the apparatus, and a control method of a wireless communication apparatus.

BACKGROUND ART

Currently, 3GPP (3rd Generation Partnership Project) drawing up technical specifications of public wireless communication networks is working on a function extension (see, for example, Non-Patent Literature 1).

According to the function extension (called Machine to Machine Equipment), information indicating service availability can flexibly be used. The information indicating service availability is MCIM (Machine Communication Identity Module). For example, MCIM can be downloaded from a network, temporarily stopped, or restarted.

Currently, information corresponding to the MCIM needs to be stored in a physical device called an SIM (Subscriber Identity Module) card. However, by handling MCIM as software, the method of storing the MCIM can also be made flexible.

CITATION LIST

Non-Patent Literature

Non-Patent Literature 1: 3GPP TR 33.812 V9.2.0 (2010-06)

SUMMARY OF INVENTION

Technical Problem

By using the above function extension, the method of using MCIM that is different from a conventional method can now be considered.

For example, when a wireless communication apparatus possessed by a user can easily receive a desired communication service from an operator that provides various kinds of communication services, it is convenient for the user. Also, it is possible to increase the opportunities for the operator to provide the various kinds of communication services.

It is desirable to receive a communication service preferred by a user with ease.

Solution to Problem

The present technology is provided in order to solve the above-mentioned issues. According to a first aspect of the present technology, there are provided an information processing apparatus, a control method thereof, and a program for causing a computer to execute the method, the information processing apparatus including a determination unit which determines whether a predetermined condition for performing communication processing between an information processing system relating to a service provider and a wireless communication apparatus is satisfied, and a control unit which sets a connection right to connect to a predetermined network using wireless communication for the wireless communication apparatus, and performs control in a manner that the wireless communication apparatus connects to the network based on the set connection right and performs the communication processing with the information processing system, when the predetermined condition is satisfied. Accordingly, when a predetermined condition is satisfied, an action of a connection right being set for the wireless communication apparatus, and the wireless communication apparatus connecting to a network based on the set connection right and performing communication processing with the information processing system is caused.

Further, according to the first aspect, the information processing apparatus may be the wireless communication apparatus. The determination unit may determine that the predetermined condition is satisfied, when a predetermined operation is received by an operation unit. When the predetermined condition is satisfied, the control unit may make a setting request for setting the connection right for the wireless communication apparatus to an RO (Registration Operator) and perform control in a manner that the wireless communication apparatus connects to the network based on the connection right set by an SHO (Selected Home Operator) according to the setting request and then performs the communication processing with the information processing system. Accordingly, when a predetermined condition is satisfied, an action of making a connection right setting request to the RO, connecting to a network based on a connection right set by the SHO according to the setting request, and then performing communication processing with the information processing system is caused.

Further, according to the first aspect, when the connection right is set for the wireless communication apparatus and the wireless communication apparatus is connected to the network, the RO may notify the information processing system of that. Accordingly, when a connection right is set for the wireless communication apparatus, and the wireless communication apparatus is connected to the network, an action of the RO notifying the information processing system of this is caused.

Further, according to the first aspect, when the connection right set for the wireless communication apparatus is invalidated, the RO may notify the information processing system of that. Accordingly, when a connection right set for the wireless communication apparatus is invalidated, an action of the RO notifying the information processing system of this is caused.

Further, according to the first aspect, the information processing apparatus may be the information processing system. The determination unit may determine whether the predetermined condition is satisfied, when a predetermined operation is received in the wireless communication apparatus. When the predetermined condition is satisfied, the control unit may make a setting request for setting the connection right for the wireless communication apparatus to an RO and perform control in a manner that the communication processing is performed between the wireless communication apparatus and the information processing system after the wireless communication apparatus is connected to the network based on the connection right set for the wireless communication apparatus by an SHO according to the setting request. Accordingly, when a predetermined condition is satisfied, an action of making a connection right setting request to the RO, and a wireless communication apparatus being connected to the network based on a connection right set for the wireless communication apparatus by the SHO according to the setting request and then performing communication processing with a wireless communication apparatus is caused.

Further, according to the first aspect, the connection right may be a right to connect to a base station operated by a communication operator with which the service provider has a contract based on contract authentication information for connecting to the base station. Accordingly, an action of using a right to connect to the base station as a connection right based on contract authentication information for connecting to the base station operated by the communication operator contracted to the service provider is caused.

Further, according to the first aspect, a limitation for performing only the communication processing between the information processing system and the wireless communication apparatus may be imposed on the connection right. Accordingly, an action of using a connection right on which a limitation for only performing communication processing between the information processing system and the wireless communication apparatus is imposed is caused.

Further, according to the first aspect, the control unit may perform control for performing, as the communication processing, content provision processing of providing content from the information processing system to the wireless communication apparatus, upload processing of uploading content from the wireless communication apparatus to the information processing system, or download processing of downloading content from the information processing system to the wireless communication apparatus. Accordingly, an action of performing content provision processing, upload processing, or download processing as communication processing is caused.

Further, according to the first aspect, the determination unit may determine whether a predetermined condition for invalidating the set connection right is satisfied. When it is determined that the predetermined condition for invalidation is satisfied, the control unit may perform control for invalidating the connection right set for the wireless communication apparatus. Accordingly, an action of determining whether a predetermined condition for invalidating a set connection right is satisfied, and invalidating a connection right set for the wireless communication apparatus when it is determined that the predetermined condition for invalidation is satisfied is caused.

Further, according to the first aspect, the information processing apparatus may be the information processing system. When it is determined that the predetermined condition for invalidation is satisfied, the control unit may perform control in a manner that an invalidation request for invalidating the connection right set for the wireless communication apparatus is made to an RO. Accordingly, an action of making an invalidation request for invalidating a connection right set for the wireless communication apparatus to the RO when it is determined that a predetermined condition for invalidation is satisfied is caused.

Further, according to the first aspect, when the communication processing performed between the information processing system and the wireless communication apparatus ends, the control unit may perform control in a manner that invalidation processing for invalidating the connection right set for the wireless communication apparatus is performed. Accordingly, when communication processing performed between the information processing system and the wireless communication apparatus ends, an action of performing invalidation processing for invalidating a connection right set for the wireless communication apparatus is caused.

According to a second aspect of the present technology, there are provided a communication system, a control method thereof, and a program for causing a computer to execute the method, the communication system including an information processing system relating to a service provider, a wireless communication apparatus which performs wireless communication, a determination unit which determines whether a predetermined condition for performing communication processing between the information processing system and the wireless communication apparatus is satisfied, and a control unit which sets a connection right to connect to a predetermined network using wireless communication for the wireless communication apparatus, and performs control in a manner that the wireless communication apparatus connects to the network based on the set connection right and performs the communication processing with the information processing system, when the predetermined condition is satisfied. Accordingly, when a predetermined condition is satisfied, an action of setting a connection right for the wireless communication apparatus, and the wireless communication apparatus connecting to the network and performing communication processing with the information processing system based on the set connection right is caused.

Advantageous Effects of Invention

According to the present technology, an excellent effect of being able to easily receive a communication service preferred by a user can be accomplished.

BRIEF DESCRIPTION OF DRAWINGS

FIG. 1 is a block diagram showing a system configuration example of a communication system 10 according to the first embodiment of the present technology.

FIG. 2 is a block diagram showing a system configuration example of a communication system 100 according to the first embodiment of the present technology.

FIG. 4 is a block diagram showing an internal configuration example of a wireless communication apparatus 300 according to the first embodiment of the present technology.

FIG. 5 A shows a use starting operation screen 400 for starting the use of a communication service performed between the wireless communication apparatus and the information processing apparatus 200.

FIG. 6 is a sequence chart showing a communication processing example between each apparatus included in the communication system 100 according to the first embodiment of the present technology.

FIG. 7 is a sequence chart showing a communication processing example between each apparatus included in the communication system 100 according to the first embodiment of the present technology.

FIG. 8 is a flow chart showing an example of the processing procedure for communication processing by the wireless communication apparatus 300 according to the first embodiment of the present technology.

FIG. 9 is a block diagram showing a system configuration example of a communication system 101 according to a second embodiment of the present technology.

FIG. 10 is a diagram showing a display screen example displayed on the display unit 370 of the wireless communication apparatus 300 according to the second embodiment of the present technology.

FIG. 11 is a sequence chart showing a communication processing example between respective apparatuses included in the communication system 101 according to the second embodiment of the present technology.

DESCRIPTION OF EMBODIMENTS

Modes for carrying out the present technology (hereinafter, referred to as embodiments) will be described below. The description will be provided in the following order:
1. First embodiment (communication control: an example in which a wireless communication apparatus holding no MCIM performs communication processing using MCIM contracted to a service providing company)
2. Second embodiment (communication control: an example in which a wireless communication apparatus holding MCIM performs communication processing using other MCIM contracted to a service providing company)
3. Modified example 1. First Embodiment Configuration Example of Communication System FIG. 1 is a block diagram showing a system configuration example of a communication system 10 according to the first embodiment of the present technology. FIG. 1 shows a configuration example of a communication system when a network configuration includes an SHO (Selected Home Operator) and an RO (Registration Operator) (for example, see Non-Patent Literature 1).

Figure 1A:
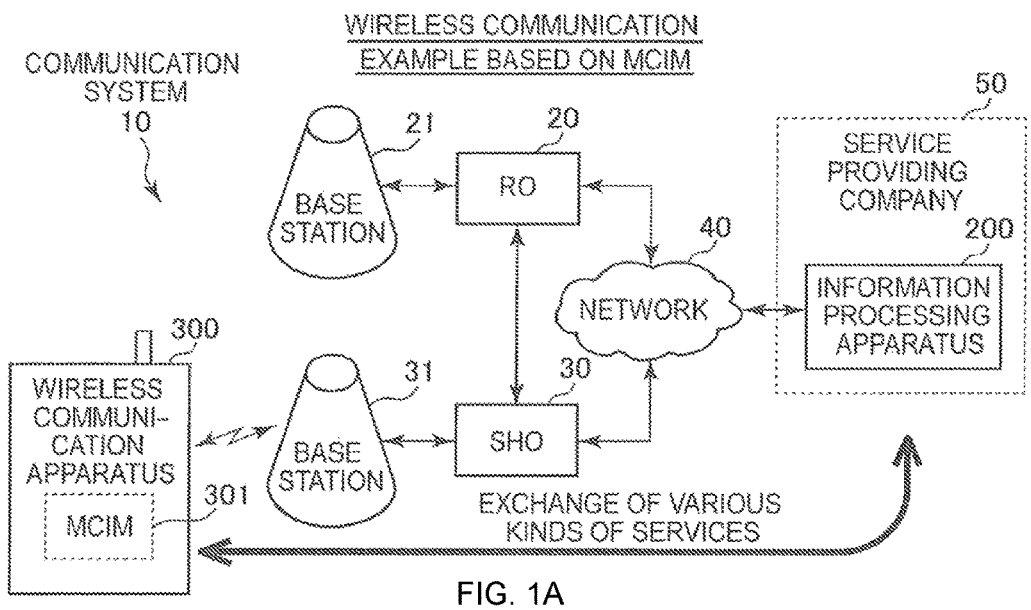
FIG. 1A shows a wireless communication example of a case in which a wireless communication apparatus 300 is holding valid MCIM (Machine Communication Identity Module) (rights of using MCIM) 301. Also.
Figure 1B:
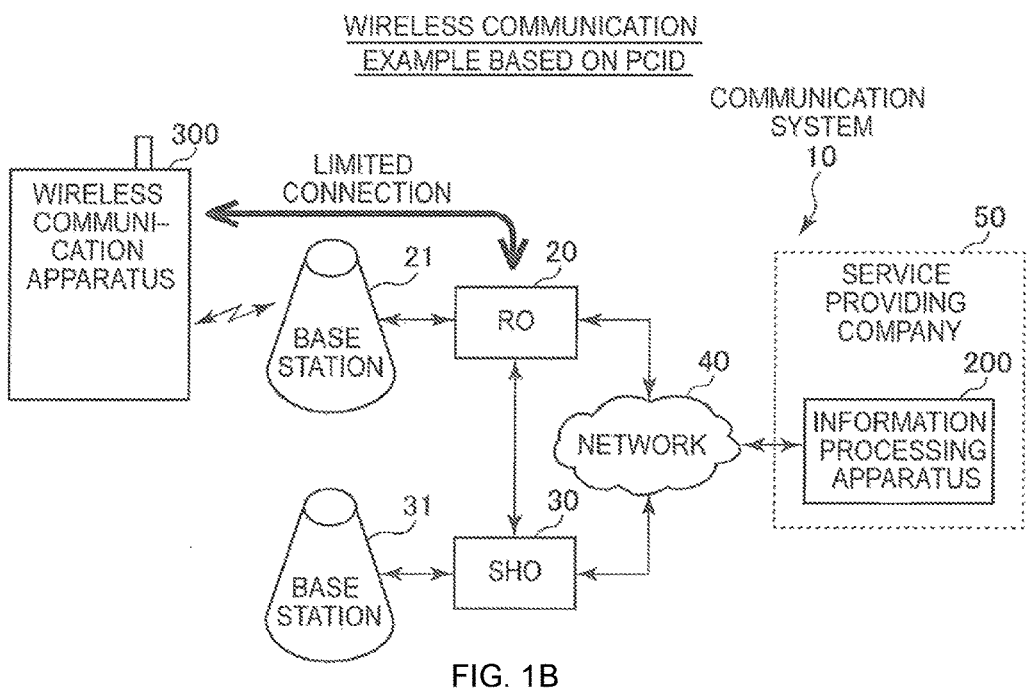
FIG. 1B shows a wireless communication example of a case in which the wireless communication apparatus 300 is not holding the valid MCIM (rights of using MCIM) 301.

FIG. 1A shows a wireless communication example of a case in which a wireless communication apparatus 300 is holding valid MCIM (Machine Communication Identity Module) (rights of using MCIM) 301. Also, FIG. 1B shows a wireless communication example of a case in which the wireless communication apparatus 300 is not holding the valid MCIM (rights of using MCIM) 301.

Here, MCIM is an example of contract authentication information, and contract authentication information is information including telephone subscriber information and information on an authentication key (authentication). MCIM is, for example, contract authentication information (a so-called soft SIM) that is not limited to a specific communication operator (a mobile phone operator) upon purchase of a device, and in which a communication operator can be flexibly set after the purchase. Rewriting of MCIM on a network facilitates separation between sales of mobile phones and selection of communication operators, and also facilitates sharing of subscriber authentication information between a plurality of wireless communication apparatuses. A case of not holding rights of using MCIM implies, for example, a case of not holding the MCIM itself, or a case of only holding MCIM invalidated by MCIM invalidation processing.

For example, rights of using MCIM can be understood as a connection right to connect to a network 40 using wireless communication (a network connection right). In other words, a connection right is a right to connect to a base station operated by a communication operator based on MCIM (contract authentication information) for connecting to the base station. Also, for example, the presence/absence of a connection right corresponds to the presence/absence of rights of using MCIM.

Here, an RO and an SHO indicate logical roles, and may be assumed to be operated by different operators, or may be assumed to be operated by the same operator. Also, it is assumed that there are a plurality of each of ROs and SHOs. Further, each of an RO and an SHO may be integrally constituted as an information processing apparatus, or may be constituted of a plurality of apparatuses. Here, RO and SHO denote relative roles when a wireless communication apparatus having valid MCIM is regarded as a reference. For this reason, an equivalent of an RO for one wireless communication apparatus also has the possibility to be equivalent to an SHO for another wireless communication apparatus.

The communication system 10 includes an RO 20, an SHO 30, base stations 21 and 31, a network 40, an information processing apparatus 200, and the wireless communication apparatus 300.

The wireless communication apparatus 300 is, for example, a mobile phone apparatus (for example, a smartphone having call functions and data communication functions). The wireless communication apparatus 300 is an example of an information processing apparatus capable of using a software-downloadable SIM (Subscriber Identity Module). Also, the wireless communication apparatus can be applied to other wireless communication apparatuses capable of using a software-downloadable SIM. For example, the wireless communication apparatus can be applied to a capturing apparatus having wireless communication functions (for example, a digital still camera and a digital video camera (a camera-integrated recorder)), and an audio output apparatus having wireless communication functions (for example, a portable music player). Also, the wireless communication apparatus can be applied to a display apparatus having wireless communication functions (for example, a digital photo frame), and an e-book display apparatus having wireless communication functions. In addition, the wireless communication apparatus can be applied to an information processing apparatus that can perform wireless communication when wireless communication equipment is installed (for example, a personal computer that does not have wireless communication functions).

As shown in FIG. 1A, when the wireless communication apparatus 300 holds valid MCIM (rights of using MCIM) 301, the wireless communication apparatus 300 is able to connect to the SHO 30 via the base station 31 based on the MCIM 301. On the other hand, when the wireless communication apparatus 300 does not hold the valid MCIM (rights of using MCIM) 301 as shown in FIG. 1B, the wireless communication apparatus 300 300 is not able to connect to the SHO 30. However, in this case, the wireless communication apparatus 300 is able to connect to the RO 20 via the base station 21 based on provisional connectivity identity (PCID).

Here, PCID is an identifier for connecting to an RO, and is given to a wireless communication apparatus (device) having the mechanism of a software-downloadable SIM.

The network 40 is a network such as a telephone network, the Internet, or the like (for example, public network). Also, the network 40 and the SHO 30 are connected via a gateway (not shown). Likewise, the network 40 and the RO 20 are connected via a gateway (not shown).

The RO 20 is a communication control apparatus that is managed by a wireless operator providing service such as initial connection registration and the like. The RO 20 corresponds to, for example, a wireless operator providing a wireless connection service (for example, a mobile phone operator). Also, the RO 20 includes a control unit (not shown).

The control unit of the RO 20 performs authentication control of a wireless communication apparatus connected via the base station 21. For example, the control unit of the RO 20 performs authentication based on PCID for a wireless communication apparatus connected via the base station 21. Then, the RO 20 provides service such as initial connection registration and the like to an authenticated wireless communication apparatus. Also, the control unit of the RO 20 is connected to the SHO 30 and exchanges various kinds of information with the SHO 30.

The base station 21 is a mobile communication base station (NodeB) that connects the wireless communication apparatus 300 and the RO 20 via a wireless line.

The SHO 30 is a communication control apparatus that is managed by a wireless operator providing a wireless connection service. The SHO 30 provides Internet services and the like, and corresponds to a wireless operator providing a wireless connection service (for example, a mobile phone operator). Also, the SHO 30 includes a control unit (not shown).

The control unit of the SHO 30 performs authentication control of a wireless communication apparatus connected via the base station 31. For example, the control unit of the SHO 30 authenticates a wireless communication apparatus holding valid MCIM (contract authentication information) of the SHO 30 among wireless communication apparatuses connected via the base station 31. Then, the SHO 30 connects the authenticated wireless communication apparatus to the network 40 via the gateway (not shown).

Also, the control unit of the SHO 30 is connected to the RO 20 and exchanges various kinds of information with the RO 20. Here, a wireless communication apparatus that does not hold valid MCIM (contract authentication information) can connect (limited connection) to the RO 20 via the SHO 30 based on PCID of the wireless communication apparatus.

The base station 31 is a mobile communication base station (NodeB) that connects the wireless communication apparatus 300 and the SHO 30 via a wireless line.

A service providing company 50 is a company that provides various kinds of communication services (SP (Service Provider)), such as mail-order selling, online games, content storage services, content delivery services, and the like. The service providing company 50 has the information processing apparatus 200 for providing these communication services. The information processing apparatus 200 is connected to the RO 20 and the SHO 30 via the network 40. Here, an operator performing various kinds of communication services is assumed to be a communication operator providing a wireless connection service, an MVNO (Mobile Virtual Network Operator) (an operator of a business model known as a virtual communication operator), or the like.

The information processing apparatus 200 is an information processing apparatus providing various kinds of communication services via the network 40, and provides the various kinds of communication services to the wireless communication apparatus 300 using wireless communication. For example, the information processing apparatus 200 provides communication services such as web services, data download services, data upload services, online gaming, and the like.

For example, as shown in FIG. 1A, when the wireless communication apparatus 300 has the valid MCIM 301, the wireless communication apparatus 300 is connected to the base station 31 via the wireless line based on the MCIM 301, and is connected to the SHO 30 via the base station 31. In this case, the wireless communication apparatus 300 is connected to the SHO 30 via the base station 31, and can be provided with various kinds of services (for example, content download) from the information processing apparatus 200. Also, when the wireless communication apparatus 300 holding the valid MCIM 301 connects to the RO 20, the wireless communication apparatus 300 is connected to the RO 20 via the SHO 30.

As shown in FIG. 1B, when the wireless communication apparatus 300 does not hold the valid MCIM 301, the wireless communication apparatus 300 can connect (limited connection) to the RO 20 via the base station 21 based on held PCID. In this case, the wireless communication apparatus 300 is connected (limited connection) to the RO 20 via the base station 21 but can only perform limited communication (for example, MCIM download and MCIM validation/invalidation).

When the wireless communication apparatus 300 does not hold the valid MCIM 301, the wireless communication apparatus 300 can connect to any of the base stations 21 and 31 according to a position at which the wireless communication apparatus 300 is being used, and is connected to the RO 20 via these base stations.

In this way, the wireless communication apparatus 300 not holding the valid MCIM 301 is not able to be provided with various kinds of services by the information processing apparatus 200. In other words, a wireless communication apparatus having no rights of using MCIM can be understood as a device (RO connected device) connected to limited services. On the other hand, a wireless communication apparatus holding rights of using MCIM can be understood as a device (SHO connected device) connected to services (normal connection). A wireless communication apparatus not holding rights of using MCIM can connect to the SHO 30 by acquiring rights of using MCIM via the RO 20 (for example, MCIM download or MCIM validation).

Therefore, when a user who has the wireless communication apparatus 300 has no MCIM contract with a communication operator that operates the SHO 30, the user is not able to receive various kinds of services from the information processing apparatus 200.

However, even when the user has no MCIM contract with the communication operator that operates the SHO 30, a case in which the user who has the wireless communication apparatus 300 wants to be temporarily provided with various kinds of services from the information processing apparatus 200 can also be assumed. Also, it can be assumed that the service providing company 50 wants to provide various kinds of services to a user who wants to receive the services from the information processing apparatus 200 even by bearing a communication fee relating to the provision of the services.

Thus, the first embodiment of the present technology shows an example in which a user who has no MCIM contract with a communication operator that operates an SHO can be easily provided with various kinds of services from the information processing apparatus 200.

[Configuration Example of Communication System]

FIG. 2 is a block diagram showing a system configuration example of a communication system 100 according to the first embodiment of the present technology.

The communication system 100 includes a network 110, base stations 122 and 132, a communication control apparatus (first communication operator) 120, a communication control apparatus (second communication operator) 130, an information processing apparatus 200, and the wireless communication apparatus 300.

Here, the communication system 100 is a system corresponding to the communication system 10 shown in FIG. 1. Specifically, the communication control apparatus (second communication operator) 130 corresponds to the SHO 30 shown in FIG. 1, the communication control apparatus (first communication operator) 120 corresponds to the RO 20 shown in FIG. 1, and the information processing apparatus 200 corresponds to the information processing apparatus 200 shown in FIG. 1. For this reason, in this example, description of parts that are common to the example and the communication system 10 shown in FIG. 2 will be partially omitted.

The network 110 is a network such as a telephone network, the Internet, or the like (for example, a public network). Also, the network 110 and the communication control apparatus (second communication operator) 130 are connected via a gateway (not shown). Likewise, the network 110 and the communication control apparatus (first communication operator) 120 are connected via a gateway (not shown).

The communication control apparatus (second communication operator) 130 is a communication control apparatus managed by a wireless operator that provides a wireless connection service, and corresponds to the SHO 30 shown in FIG. 1. In other words, the communication control apparatus (second communication operator) 130 provides Internet services and the like, and corresponds to a wireless operator that provides a wireless connection service (for example, a mobile phone operator). Also, the communication control apparatus (second communication operator) 130 includes a control unit 131.

The control unit 131 exercises authentication control of wireless communication apparatuses connected via the base station 132. For example, the control unit 131 authenticates a wireless communication apparatus holding valid MCIM (contract authentication information) of the communication control apparatus (second communication operator) 130 among wireless communication apparatuses connected via the base station 132. Then, the communication control apparatus 120 connects the authenticated wireless communication apparatus to the network 110 via the gateway (not shown).

Also, the control unit 131 is connected to the communication control apparatus (first communication operator) 120 and exchanges various kinds of information with the communication control apparatus (first communication operator) 120. Here, a wireless communication apparatus that does not hold valid MCIM (contract authentication information) can connect (limited connection) to the communication control apparatus (first communication operator) 120 via the communication control apparatus (second communication operator) 130 based on PCID of the wireless communication apparatus. Also, when an MCIM setting request is received from the wireless communication apparatus 300 and the information processing apparatus 200, the control unit 131 transmits a setting instruction in accordance with the MCIM setting request to the communication control apparatus (first communication operator) 120.

The base station 132 is a mobile communication base station (NodeB) that connects the wireless communication apparatus 300 and the communication control apparatus (second communication operator) 130 via a wireless line.

The communication control apparatus (first communication operator) 120 is a communication control apparatus managed by a wireless operator that provides services such as initial connection registration and the like, and corresponds to the RO 20 shown in FIG. 1. The communication control apparatus (first communication operator) 120 corresponds to, for example, a wireless operator providing a wireless connection service (for example, a mobile phone operator). Also, the communication control apparatus (first communication operator) 120 includes a control unit 121.

The control unit 121 exercises various kinds of control relating to a wireless communication apparatus connected directly or via the communication control apparatus (second communication operator) 130. For example, the control unit 121 exercises authentication control of a wireless communication apparatus connected via the base station 122. For example, the control unit 121 authenticates a wireless communication apparatus connected via the base station 122 based on PCID. Then, the control unit 121 provides services, such as initial connection registration and the like, to the authenticated wireless communication apparatus. Also, the control unit 121 is connected to the communication control apparatus (second communication operator) 130 to exchange various kinds of information with the communication control apparatus (second communication operator) 130.

For example, in the communication system 100, a wireless communication apparatus holding valid MCIM is connected to the base station 132 via a wireless line, and connected to the communication control apparatus (second communication operator) 130 via the base station 132. When a wireless communication apparatus holding valid MCIM is connected to the communication control apparatus (first communication operator) 120, the wireless communication apparatus is connected to the communication control apparatus (first communication operator) 20 via the communication control apparatus (second communication operator) 130.

Also, a wireless communication apparatus not holding valid MCIM can connect (limited connection) to the communication control apparatus (first communication operator) 120 via the base station 122 based on PCID of the wireless communication apparatus. A wireless communication apparatus not holding valid MCIM can connect to any of the base stations 122 and 132 according to a position at which the wireless communication apparatus is being used, and is connected to the communication control apparatus (first communication operator) 120 via these base stations.

Here, an example of setting valid MCIM (rights of using MCIM) in the communication system 100 (an example of setting a network connection right) is described. For example, MCIM is caused to be held in each wireless communication apparatus. Then, based on an instruction from the control unit 121, the communication control apparatus (second communication operator) 130 performs validation/invalidation of the MCIM held in each wireless communication apparatus, and thereby can set the rights of using the MCIM. Validation/invalidation of the MCIM held in each wireless communication apparatus can also be performed on the side of the communication control apparatus (first communication operator) 120. For this reason, the rights of using the MCIM may be set by the control unit 121 performing validation/invalidation of the MCIM held in each wireless communication apparatus.

Also, rights of using MCIM may be set by transmitting the MCIM itself instead of causing the MCIM to be held in each wireless communication apparatus. For example, setting information (including the MCIM) is transmitted from the communication control apparatus (second communication operator) 130 to a wireless communication apparatus via the control unit 121. By causing the MCIM included in the setting information to be held in a wireless communication apparatus, valid MCIM is set in the wireless communication apparatus. Here, transmission of the setting information (including the MCIM) to each wireless communication apparatus can also be performed on the side of the communication control apparatus (first communication operator) 120. For this reason, the rights of using the MCIM may be set by the control unit 121 transmitting the setting information (including the MCIM) to each wireless communication apparatus.

The information processing apparatus 200 is an information processing apparatus providing various kinds of communication services via the network 110 (for example, a content server), and provides the various kinds of communication services to each wireless communication apparatus using wireless communication. These various kinds of communication services will be described in detail with reference to FIG. 5 to FIG. 7 and the like.

Accordingly, the communication system 100 is a wireless communication system having wireless communication apparatuses (devices), contract authentication information on which can be rewritten via a network.

[Configuration Example of Information Processing Apparatus]

Figure 3:
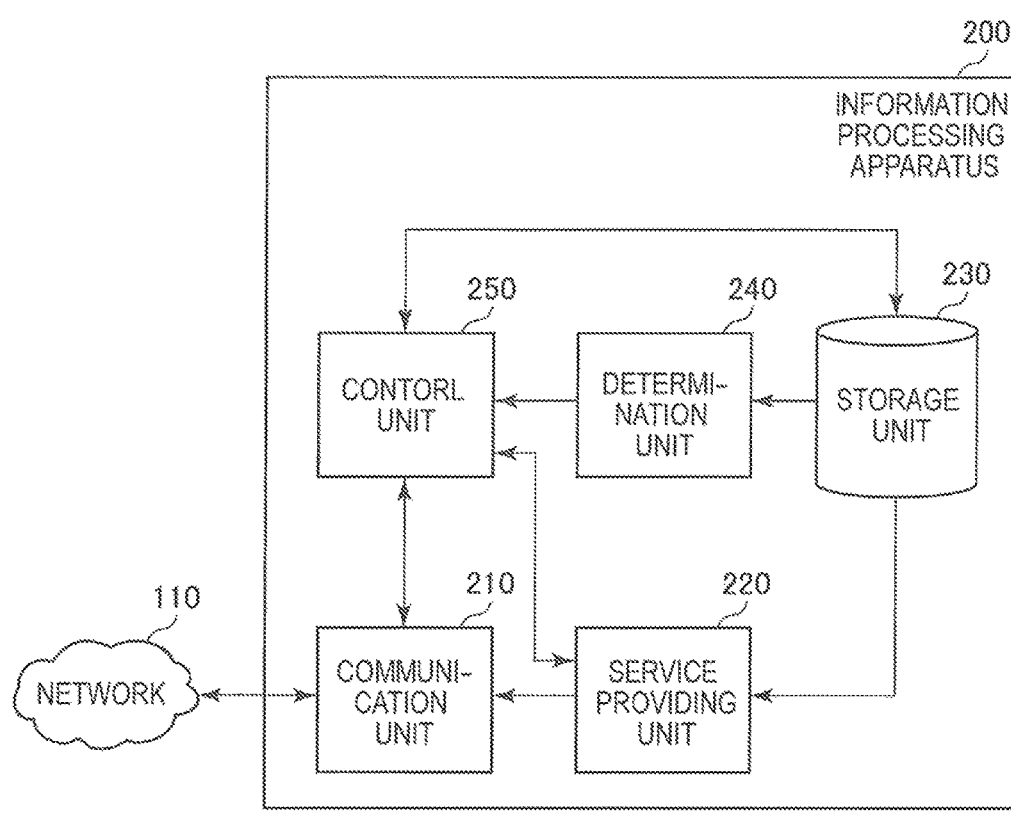
FIG. 3 is a block diagram showing a functional configuration example of an information processing apparatus 200 according to the first embodiment of the present technology.

FIG. 3 is a block diagram showing a functional configuration example of the information processing apparatus 200 according to the first embodiment of the present technology.

The information processing apparatus 200 includes a communication unit 210, a service providing unit 220, a storage unit 230, a determination unit 240, and a control unit 250. Here, the information processing apparatus 200 is an example of an information processing apparatus described in the claims.

The communication unit 210 is connected to the network 110, and performs communication that is performed between respective wireless communication apparatuses connected via the network 110 based on control of the control unit 250. For example, the communication unit 210 receives each piece of information (for example, various kinds of notifications) transmitted from each wireless communication apparatus via the network 110, and outputs the received pieces of information to the control unit 250. Also, the communication unit 210 transmits various kinds of content output from the service providing unit 220 to respective wireless communication apparatuses via the network 110.

The service providing unit 220 provides various kinds of services to a wireless communication apparatus connected via the network 110 according to a request from the wireless communication apparatus based on control of the control unit 250. Also, the service providing unit 220 uses various kinds of data stored in the storage unit 230 to provide various kinds of services. For example, when a content download request is received from the wireless communication apparatus 300, the service providing unit 220 acquires content relating to the request (for example, game content) from the storage unit 230. Then, the service providing unit 220 transmits the acquired content to the wireless communication apparatus 300 via the communication unit 210.

The storage unit 230 is a storage unit that stores various kinds of data of a case in which the service providing unit 220 provides various kinds of communication services, and data transmitted from a wireless communication apparatus. The storage unit 230 stores, for example, content uploaded from a wireless communication apparatus (for example, image content), content for providing content to be downloaded (for example, game content or a web site), and the like.

The determination unit 240 determines whether a predetermined condition for performing communication processing between the information processing apparatus 200 and the wireless communication apparatus 300 is satisfied, and outputs the determination results to the control unit 250. Also, the determination unit 240 determines whether a predetermined condition for invalidating a connection right set for the wireless communication apparatus 300 (rights of using MCIM) is satisfied, and outputs the determination results to the control unit 250. Determination by the determination unit 240 will be described in detail with reference to FIG. 11 and FIG. 12.

The control unit 250 exercises control relating to communication performed between respective wireless communication apparatuses connected via the network 110. For example, the control unit 250 controls content provision processing, upload processing, or download processing (communication processing) to be performed. Content provision processing is communication processing of providing content from the information processing apparatus 200 to the wireless communication apparatus 300. Also, upload processing is communication processing of uploading content from the wireless communication apparatus 300 to the information processing apparatus 200, and download processing is communication processing of downloading content from the information processing apparatus 200 to the wireless communication apparatus 300.

[Configuration Example of Wireless Communication Apparatus]

FIG. 4 is a block diagram showing an internal configuration example of the wireless communication apparatus 300 according to the first embodiment of the present technology.

The wireless communication apparatus 300 includes an antenna 311, an antenna shared unit 312, a modulation unit 321, a demodulation unit 322, a control unit 330, a memory 340, and an MCIM information storage unit 350. In addition, the wireless communication apparatus 300 includes an operation unit 360, a display unit 370, a position information acquisition unit 380, a microphone 391, and a speaker 392. The respective units are connected by a bus 331. Here, the wireless communication apparatus 300 is an example of an information processing apparatus described in the claims.

When, for example, reception processing is performed, a radio wave received by the antenna 311 is demodulated by the demodulation unit 322 after going through the antenna shared unit 312 and the demodulated received data is supplied to the control unit 330. If the reception processing is call reception processing, the demodulated received data (audio data) goes through the control unit 330 before being output from the speaker 392 as a voice.

When, for example, transmission processing is performed, transmission data output by the control unit 330 is modulated by the modulation unit 321 and the modulated transmission data is transmitted from the antenna 311 after going through the antenna shared unit 312. If the transmission processing is call transmission processing, audio data input from the microphone 391 is modulated by the modulation unit 321 after going through the control unit 330 and the modulated transmission data (audio data) is transmitted from the antenna 311 after going through the antenna shared unit 312.

The control unit 330 exercises various kinds of control based on a control program stored in the memory 340. The control unit 330 is constituted of, for example, a microprocessor. The control unit 330 is connected to, for example, the modulation unit 321 and the demodulation unit 322 and transmits/receives various kinds of data to/from the communication control apparatus (second communication operator) 130 connected via the base stations 132. In addition, the control unit 330 performs connection processing to the communication control apparatus (first communication operator) 120 via a wireless line in a limited connection based on PCID without MCIM. Note that the control unit 330 is an example of the determination unit and the control unit described in claims.

The memory 340 is a memory that stores control programs for the control unit 330 to exercise various kinds of control, transmission data, reception data, and the like. The memory 340 includes, for example, a ROM (Read Only Memory) and a RAM (Random Access Memory). Also, in the memory 340, terminal identification information (IMEI (International Mobile Equipment Identity) #0) for specifying the wireless communication apparatus 300 is stored.

The MCIM information storage unit 350 is a memory to hold MCIM (contract authentication information). As the MCIM information storage unit 350, for example, a UICC (Universal Integrated Circuit) card may be used or a dedicated memory to maintain MCIM securely may be used. When a UICC card is used as the MCIM information storage unit 350, a UICC card capable of performing processing to enable or disable MCIM is used, instead of a UICC card into which MCIM is fixedly written. That is, a UICC card in which the control unit 330 can perform processing to enable or disable MCIM based on information (setting information, invalidation information) received by the antenna 311 and demodulated. In addition, a UICC card capable of rewriting MCIM is used. The processing to enable or disable MCIM can be performed by enable processing and disable processing defined by 3GPP (Third Generation Partnership Project). Further, the MCIM information storage unit 350 may be mounted in a memory 340 by maintaining some region securely in the memory 340.

The operation unit 360 is an operation reception unit that receives an operation input operated by the user and outputs a signal corresponding to the received operation input to the control unit 330. The operation unit 360 includes various keys such as numeric keys and alphabetical keys. The operation unit 360 also receives an operation for performing various kinds of communication services between the wireless communication apparatus 300 and the information processing apparatus 200.

The display unit 370 is a display unit that displays various kinds of information (character information, time information and the like) based on control of the control unit 330. The display unit 370 displays, for example, each piece of information (for example, display screens shown in FIG. 5) used for various communication service with the information processing apparatus 200. As the display unit 370, for example, a display panel such as an organic EL (Electro Luminescence) panel and LCD (Liquid Crystal Display) panel can be used. The operation unit 360 and the display unit 370 can integrally be configured by using a touch panel in which operation input can be done by the display surface thereof being touched by a finger of the user or a finger of the user being brought closer to the display surface.

For example, the control unit 330 determines whether a predetermined condition for performing communication processing between the information processing apparatus 200 and the wireless communication apparatus 300 is satisfied. Specifically, when a predetermined operation is received by the operation unit 360, the control unit 330 determines that the predetermined condition is satisfied. Here, the predetermined operation is, for example, a service use starting operation (502) shown in FIG. 6.

When the predetermined condition is satisfied, the control unit 330 sets a connection right (rights of using MCIM) for the wireless communication apparatus 300, and controls the wireless communication apparatus 300 to connect to the network 110 and perform communication processing with the information processing apparatus 200 based on the connection right. Specifically, the control unit 330 makes an MCIM setting request for setting the connection right for the wireless communication apparatus 300 to the communication control apparatus (first communication operator) 120. Then, the control unit 330 connects to the network 110 based on the connection right set by the communication control apparatus (second communication operator) 130 according to the setting request, and then controls communication processing to be performed between the wireless communication apparatus 300 and the information processing apparatus 200. For example, the control unit 330 controls content provision processing, upload processing, or download processing to be performed as described above.

Here, a connection right is a right to connect to a base station operated by a communication operator (for example, the second communication operator) with which the service providing company 50 has a contract based on contract authentication information (for example, MCIM) for connecting to the base station. Also, as the connection right, a connection right that is limited to only performing specific communication processing between the information processing apparatus 200 and the wireless communication apparatus 300 may be set. For example, it is possible to impose a limitation of not enabling access to a domain of the information processing apparatus 200 only, and the like.

When the connection right is set for the wireless communication apparatus 300, and the wireless communication apparatus 300 is connected to the network 110, the communication control apparatus (first communication operator) 120 notifies the information processing apparatus 200 of this.

The control unit 330 determines whether a predetermined condition for invalidating the set connection right (for example, a service use ending operation (520) shown in FIG. 7) is satisfied. When it is determined that the predetermined condition for invalidation is satisfied, the control unit 330 controls the connection right set for the wireless communication apparatus 300 to be invalidated.

Also, when the communication processing performed between the information processing apparatus 200 and the wireless communication apparatus 300 ends, the control unit 330 controls invalidation processing for invalidating the connection right set for the wireless communication apparatus 300 to be performed.

Further, when the connection right set for the wireless communication apparatus 300 is invalidated, the communication control apparatus (first communication operator) 120 notifies the information processing apparatus 200 of this.

The position information acquisition unit 380 acquires position information indicating the position where the wireless communication apparatus 300 is located and outputs the acquired position information to the control unit 330. The position information acquisition unit 380 can be realized by a GPS (Global Positioning System) unit that calculates position information based on a GPS signal received by a GPS signal receiving antenna (not shown). The calculated position information includes each piece of data on the position such as the latitude, longitude, altitude and the like when the GPS signal is received. Alternatively, a position information acquisition apparatus that acquires position information by a different acquisition method of position method may be used. For example, a position information acquisition apparatus that acquires position information by deriving position information by using access point information by wireless LAN (Local Area Network) present thereabound.

[Example of Display of Service Use Starting Operation Screen and Service Use Ending Operation Screen]

FIG. 5 is a diagram showing a display screen example displayed on the display unit 370 of the wireless communication apparatus 300 according to the first embodiment of the present technology.

Figure 5A:
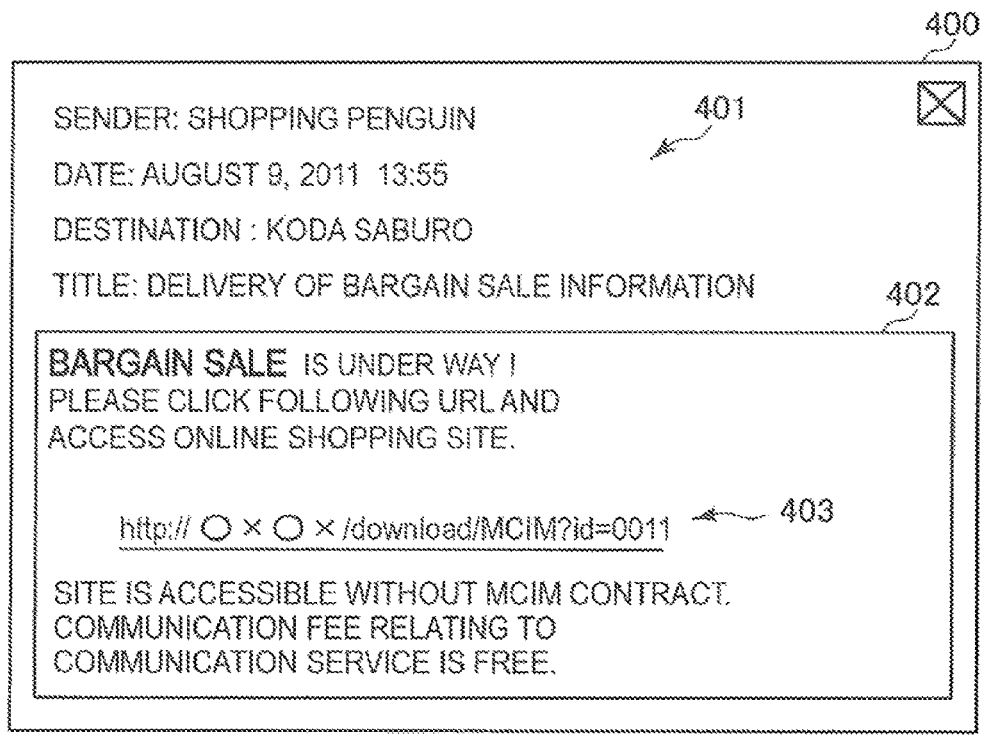
FIG. 5 is a diagram showing a display screen example displayed on the display unit 370 of the wireless communication apparatus 300 according to the first embodiment of the present technology.
FIG. 5B shows a use ending operation screen for ending the use of a communication service performed between the wireless communication apparatus and the information processing apparatus 200.

FIG. 5A shows a use starting operation screen 400 for starting the use of a communication service performed between the wireless communication apparatus and the information processing apparatus 200. In FIG. 5A, the use starting operation screen 400 in the form of email is shown as an example. This use starting operation screen 400 is assumed to be acquired through reception processing of email and stored in the memory 340 in a period of time of holding MCIM (past).

The use starting operation screen 400 is an operation screen for accessing a web site provided by the information processing apparatus 200 (for example, an online shopping site), and in which a header information display area 401 and a body display area 402 are provided. For convenience of description, illustration and description of other information displayed in the use starting operation screen 400 will be omitted.

The header information display area 401 is an area that displays header information, such as a sender, a date, a destination, a title, and the like, displayed in email.

The body display area 402 is an area in which a message input by the sender and the like is displayed. For example, when a communication service performed between the wireless communication apparatus and the information processing apparatus 200 is used, a message indicating that no MCIM contract is necessary and no communication fee is charged is displayed.

Also, in the body display area 402, a URL (Uniform Resource Locator) 403 for accessing the information processing apparatus 200 of the service providing company 50 is displayed. The URL 403 corresponds to a product guide URL mentioned in so-called advertising email.

For example, a user of the wireless communication apparatus 300 causes the display unit 370 to display the use starting operation screen 400, and performs a click operation of the URL 403 through an operation input to the operation unit 360. When the click operation is received, the control unit 330 controls communication processing to be started. This processing will be described in detail with reference to FIG. 6 and FIG. 7.

Figure 5B:
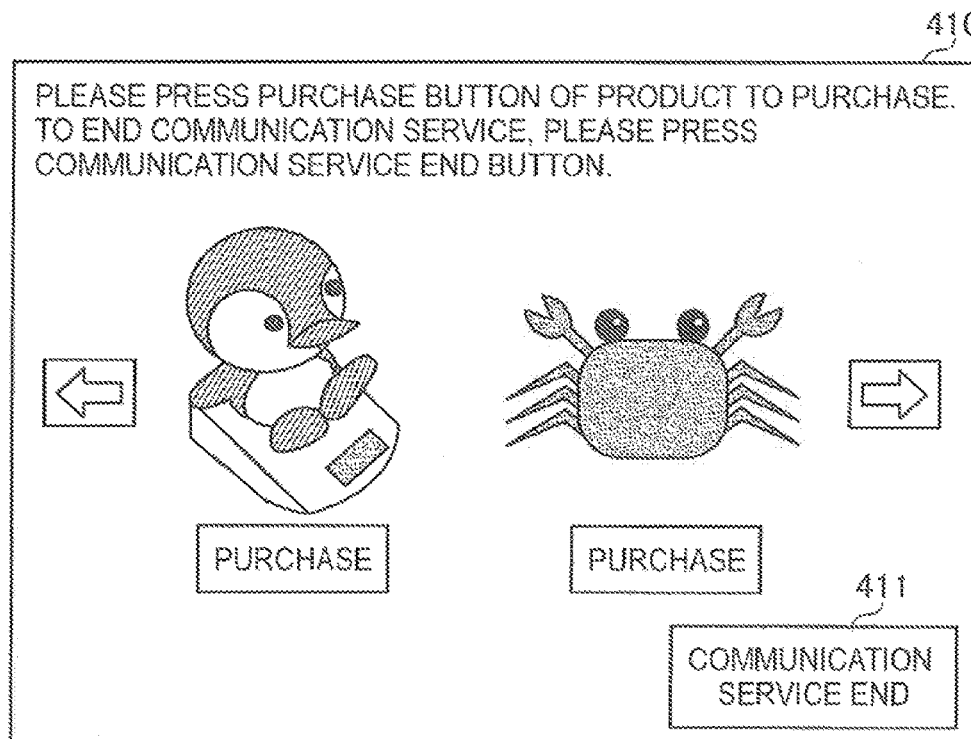

FIG. 5B shows a use ending operation screen for ending the use of a communication service performed between the wireless communication apparatus and the information processing apparatus 200. As an example, FIG. 5B shows a product purchasing operation screen 410 displayed when the communication service is being used. This product purchasing operation screen 410 is assumed to be displayed on the display unit 370, for example, according to a user operation or automatically.

In a display screen in which a communication service (a web site provided by the information processing apparatus 200 (for example, an online shopping site)) is in use, the product purchasing operation screen 410 provides a use ending operation button for the communication service (a communication service end button 411). For convenience of description, illustration and description of other information displayed in the product purchasing operation screen 410 will be omitted.

The communication service end button 411 is a button that is pressed to end the use of the communication service performed between the wireless communication apparatus and the information processing apparatus 200.

For example, while the communication service end button 411 is displayed on the display unit 370, the user of the wireless communication apparatus 300 performs a pressing operation on the communication service end button 411 through an operation input to the operation unit 360. When the pressing operation is received, the control unit 330 controls the communication processing to be ended. This processing will be described in detail with reference to FIG. 6 and FIG. 7.

[Communication Example of Case of Using Communication Service]

FIG. 6 and FIG. 7 are sequence charts showing a communication processing example between each apparatus included in the communication system 100 according to the first embodiment of the present technology.

FIG. 6 and FIG. 7 illustrate an example of connecting to the communication control apparatus (second communication operator) 130 using MCIM contracted to the service providing company 50 when the wireless communication apparatus 300 is not holding MCIM (MCIM in accordance with a user contract). Description will be made by referring to MCIM contracted to the service providing company 50 as SP MCIM below to distinguish the SP MCIM from MCIM in accordance with a user contract. In FIG. 6 and FIG. 7, the wireless communication apparatus 300 is assumed to be in a connected state (501) with the communication control apparatus (first communication operator) 120. Also, FIG. 6 and FIG. 7 illustrate an example of communication processing in the case of using a communication service provided by the information processing apparatus 200 (for example, an online shopping site) by operating the wireless communication apparatus 300.

At first, by a user operation, the display unit 370 of the wireless communication apparatus 300 is caused to display a display screen for performing a service use starting operation for starting a communication service between the wireless communication apparatus and the information processing apparatus 200. For example, the use starting operation screen 400 shown in FIG. 5A is displayed on the display unit 370 of the wireless communication apparatus 300.

In the use starting operation screen 400 shown in FIG. 5A, a click operation of the URL 403 is performed (502). In this way, when the service use starting operation is received in the wireless communication apparatus 300 (502), an SP MCIM setting request is transmitted from the wireless communication apparatus 300 to the communication control apparatus (first communication operator) 120 (503 and 504). In this case, since the wireless communication apparatus 300 is in the connected state (501) with the communication control apparatus (first communication operator) 120, the SP MCIM setting request is directly transmitted from the wireless communication apparatus 300 to the communication control apparatus (first communication operator) 120 (503 and 504).

The SP MCIM setting request is a request for acquiring MCIM (SP MCIM) prepared by (contracted to) the service providing company 50 in advance, and is transmitted based on the URL 403. This SP MCIM setting request includes identification information for identifying the wireless communication apparatus 300, and type information for specifying the type of a wireless communication apparatus (for example, a mobile phone apparatus). Here, the identification information is, for example, a unique ID of the wireless communication apparatus 300 (for example, IMEI#01 stored in the memory 340).

When the SP MCIM setting request is received (504), the control unit 121 of the communication control apparatus (first communication operator) 120 transmits an SP MCIM setting instruction to the communication control apparatus (second communication operator) 130 (505 and 506). This SP MCIM setting instruction is an instruction to set valid MCIM (MCIM contracted to the service providing company 50) for a wireless communication apparatus (the wireless communication apparatus 300) of a transmission source relating to an SP MCIM setting request.

When the SP MCIM setting instruction is received (506), the control unit 131 of the communication control apparatus (second communication operator) 130 transmits SP MCIM setting information to the wireless communication apparatus 300 via the communication control apparatus (first communication operator) 120 (507 to 510). This SP MCIM setting information is information for setting SP MCIM for the wireless communication apparatus 300, and includes SP MCIM. In other words, this example shows an example of SP MCIM being downloaded from the communication control apparatus (second communication operator) 130 to the wireless communication apparatus 300 via the communication control apparatus (first communication operator) 120. However, by causing the wireless communication apparatus 300 to hold SP MCIM and performing validation/invalidation of the held SP MCIM, the SP MCIM may be set for the wireless communication apparatus 300. In this case, the MCIM setting information includes information for validating the SP MCIM held in the wireless communication apparatus 300. Even when the SP MCIM is kept held in the wireless communication apparatus 300, the SP MCIM is invalidated at normal times, and thus a user is not able to use the SP MCIM.

For example, a fixed limitation may be put on the SP MCIM. As this fixed limitation, it is possible to impose a limitation of not enabling access to a domain of the information processing apparatus 200 only, and the like.

When the wireless communication apparatus 300 receives the SP MCIM setting information (510), valid MCIM (SP MCIM) is set for the wireless communication apparatus 300 (511). Specifically, the downloaded SP MCIM is written in the MCIM information storage unit 350 of the wireless communication apparatus 300 (511). Accordingly, the valid MCIM (SP MCIM) is held in the wireless communication apparatus 300, and the wireless communication apparatus 300 is put in a connected state (512) with the communication control apparatus (second communication operator) 130. In other words, the connection right to the communication control apparatus (second communication operator) 130 is set for the wireless communication apparatus 300. During this connection processing, the communication control apparatus (second communication operator) 130 may be notified of the identification information on the wireless communication apparatus 300. Accordingly, the communication control apparatus (second communication operator) 130 can easily detect that a connection with the wireless communication apparatus 300 has been completed.

When the wireless communication apparatus 300 is put in the connected state 512 with the communication control apparatus (second communication operator) 130, the communication control apparatus (second communication operator) 130 transmits a connection completion notification to the communication control apparatus (first communication operator) 120 (513 and 514). This connection completion notification is information for providing a notification that the wireless communication apparatus 300 has been connected. When the connection completion notification is received (514), the control unit 121 of the communication control apparatus (first communication operator) 120 transmits the connection completion notification to the information processing apparatus 200 (515 and 516).

When the communication control apparatus (second communication operator) 130 is notified of the identification information on the wireless communication apparatus 300 during the aforementioned connection processing (512), the communication control apparatus (first communication operator) 120 may be notified of them (513 and 514). In this case, the information processing apparatus 200 may be notified of the identification information on the wireless communication apparatus 300 in the same way (515 and 516). Accordingly, the communication control apparatus (first communication operator) 120 and the information processing apparatus 200 can easily detect that the connection between the communication control apparatus (second communication operator) 130 and the wireless communication apparatus 300 has been completed.

Here, the wireless communication apparatus 300 is in the connected state (512) with the communication control apparatus (second communication operator) 130. For this reason, the wireless communication apparatus 300 can connect to the information processing apparatus 200 via the communication control apparatus (second communication operator) 130, and perform communication processing with the information processing apparatus 200 (517 to 519). In other words, it becomes possible to use a communication service via the network (for example, the Internet) 110 (517 to 519).

For example, based on a user operation, the display unit 370 can be caused to display the product purchasing operation screen 410 shown in FIG. 5B. The product purchasing operation screen 410 is a web site provided by the information processing apparatus 200. The user of the wireless communication apparatus 300 can see and purchase a product in the product purchasing operation screen 410. For example, it is possible to see and purchase a penguin doll and a crab.

Here, the case of ending the use of a communication service performed through a connection based on SP MCIM is described. For example, the user can end the use of the communication service by performing a pressing operation on the communication service end button 411 in the product purchasing operation screen 410 shown in FIG. 5B (520).

In this way, when the service use ending operation is performed (520), disconnection processing is performed between the wireless communication apparatus 300 and the communication control apparatus (second communication operator) 130 (521 and 522). After this disconnection processing is performed (521 and 522), MCIM invalidation processing is performed in the wireless communication apparatus 300 (523). In other words, the MCIM (SP MCIM) written in the MCIM information storage unit 350 is erased (523). Accordingly, the wireless communication apparatus 300 is put in a connected state (524) with the communication control apparatus (first communication operator) 120.

After the disconnection processing is performed (521 and 522), the communication control apparatus (second communication operator) 130 transmits a disconnection completion notification for providing a notification that the connection with the wireless communication apparatus 300 has been disconnected to the communication control apparatus (first communication operator) 120 (525 and 526). When the disconnection completion notification is received (526), the control unit 121 of the communication control apparatus (first communication operator) 120 transmits the disconnection completion notification (invalidation notification) to the information processing apparatus 200 (527 and 528).

If a notification of the identification information on the wireless communication apparatus 300 is provided when these notifications are provided (525 to 528), the identification information may be included in a notification to be a next transmission target and transmitted (525 to 528). Accordingly, the communication control apparatus (first communication operator) 120 and the information processing apparatus 200 can easily detect that the connection between the communication control apparatus (second communication operator) 130 and the wireless communication apparatus 300 has been disconnected.

In this example, the use of a communication service performed through a connection based on SP MCIM is ended by a pressing operation on the communication service end button 411 has been described, but another condition may be set as a condition for end processing (a predetermined condition for invalidation processing). For example, when an operation of closing an application (for example, a browser) in use is performed, the case of a fixed time (for example, one hour) elapsing after the download of the SP MCIM can be set as the condition for end processing. Also, when the amount of communication in service use exceeds a fixed value, the case of the number of seen or purchased products (for example, a quantity-limited product) exceeding a fixed value can be set as the condition for end processing.

In this example, when the wireless communication apparatus 300 is put in the connected state (512) with the communication control apparatus (second communication operator) 130, a connection completion notification is transmitted (513 to 516), but the transmission of the connection completion notification may be omitted. Also, in this example, a disconnection completion notification is transmitted (525 to 528) after disconnection processing is performed (521 and 522), but the transmission of the disconnection completion notification may be omitted.

Further, this example shows content provision processing of providing content (for example, a web site) from the information processing apparatus 200 to the wireless communication apparatus 300 when the wireless communication apparatus 300 is put in the connected state (512) with the communication control apparatus (second communication operator) 130. However, upload processing of uploading content from the wireless communication apparatus 300 to the information processing apparatus 200 or download processing of downloading content from the information processing apparatus 200 to the wireless communication apparatus 300 may be performed.

In general, a user uses a communication service by way of a communication operator with which a contract has been made in advance. However, the user himself/herself is assumed to contract with the communication operator, and thus is not able to use a contract made by a service provider (for example, a contract such as a toll-free call).

On the other hand, in the first embodiment of the present technology, even a user who has not contracted for the MCIM of the communication control apparatus (second communication operator) 130 can easily receive various kinds of communication services of the service providing company 50. Specifically, using MCIM of the service providing company 50 (SP MCIM), it is possible to receive the various kinds of communication services of the service providing company 50. In other words, even when a user who has not contracted for the MCIM of the communication control apparatus (second communication operator) 130 uses the wireless communication apparatus 300 that is not holding MCIM, the user can easily receive the various kinds of communication services of the service providing company 50.

The service providing company 50 can cause the wireless communication apparatus 300 to download MCIM for which a contract has been made in advance (SP MCIM) and to use the downloaded MCIM for a predetermined period of time (for example, one hour) only. Accordingly, it is possible to increase opportunities to show the user of the wireless communication apparatus 300 a web site of the service providing company 50.

In addition, when communication using the MCIM of the service providing company 50 (SP MCIM) is performed, a communication fee relating to the communication is charged to the service providing company 50. For this reason, a user who is receiving various kinds of communication services of the service providing company 50 does not worry about a communication fee relating to the communication services, and thus can calmly enjoy the communication services. Also, by enabling the user to enjoy the services as above, rapport with the user is improved, so that the service providing company 50 can ensure a stable profit from continuous use by the user.

In other words, even when there is no contract authentication information on a user himself/herself, the user can easily enjoy a preferred communication service. Also, on the side of a service provider, it is possible to increase opportunities to get a user to use communication services.

[Operational Example of Communication System]

Next, operation of the communication system 100 according to the first embodiment of the present technology will be described with reference to drawings.

[Operational Example of Wireless Communication Apparatus]

FIG. 8 is a flow chart showing an example of a processing procedure for communication processing by the wireless communication apparatus 300 according to the first embodiment of the present technology.

At first, the control unit 330 decides whether or not a service use starting operation has been received (step S901), and continues monitoring when the service use starting operation has not been received. On the other hand, when the service use starting operation has been received (step S901), the control unit 330 transmits an SP MCIM setting request to the communication control apparatus (first communication operator) 120 (step S902). Here, step S901 is an example of a determination procedure described in the claims.

Subsequently, the control unit 330 decides whether or not SP MCIM setting information has been received (step S903), and continues monitoring when SP MCIM setting information has not been received. On the other hand, when MCIM setting information has been received (step S903), the control unit 330 performs SP MCIM setting processing (step S904). Specifically, the control unit 330 writes downloaded SP MCIM in the MCIM information storage unit 350.

Subsequently, the control unit 330 performs connection processing with the communication control apparatus (second communication operator) 130 based on the set SP MCIM (step S905). Accordingly, the wireless communication apparatus 300 is put in a connected state with the communication control apparatus (second communication operator) 130.

Subsequently, the control unit 330 connects to the information processing apparatus 200 via the communication control apparatus (second communication operator) 130, and performs communication processing with the information processing apparatus 200 (step S906). Subsequently, the control unit 330 decides whether or not a service use ending operation has been performed (step S907), and returns to step S906 when a service use ending operation has not been performed. On the other hand, when a service use ending operation has been performed (step S907), the control unit 330 performs disconnection processing between the wireless communication apparatus and the communication control apparatus (second communication control apparatus) 130 (step S908).

Subsequently, the control unit 330 performs SP MCIM invalidation processing (step S909). Here, steps S902 to S909 are an example of a control procedure described in the claims.

2. Second Embodiment

The first embodiment of the present technology has shown an example in which a wireless communication apparatus holding no MCIM makes an SP MCIM setting request and connects to an SHO based on SP MCIM acquired through the setting request. However, a wireless communication apparatus holding MCIM may make an SP MCIM setting request and newly connect to an SHO based on SP MCIM acquired through the setting request.

Therefore, a second embodiment of the present technology shows an example in which a wireless communication apparatus holding MCIM makes an SP MCIM setting request and newly connects to an SHO based on SP MCIM acquired through the setting request. The configuration of a communication system according to the second embodiment of the present technology is approximately the same as the example shown in FIG. 2 or the like. For this reason, description of parts that are common to the second embodiment and the first embodiment of the present technology will be partially omitted.

[Configuration Example of Communication System]

FIG. 9 is a block diagram showing a system configuration example of a communication system 101 according to a second embodiment of the present technology.

The communication system 101 differs only in that a communication control apparatus (third communication operator) 140 and a base station 142 are added to the communication system 100 shown in FIG. 2. Accordingly, the communication control apparatus (third communication operator) 140 and the base station 142 will be mainly described below, and description of parts that are common to the communication systems 100 and 101 will be partially omitted.

The communication control apparatus (third communication operator) 140 is a communication control apparatus managed by a wireless operator that provides a wireless connection service (different from a second communication operator), and corresponds to the SHO 30 shown in FIG. 1. In other words, the communication control apparatus (third communication operator) 140 provides the Internet, service, and the like, and corresponds to, for example, a wireless operator that provides a wireless connection service (for example, a mobile phone operator). Also, the communication control apparatus (third communication operator) 140 includes a control unit 141.

The control unit 141 exercises authentication control of wireless communication apparatuses connected via the base station 142. For example, the control unit 141 authenticates a wireless communication apparatus holding valid MCIM (contract authentication information) of the communication control apparatus (third communication operator) 140 among the wireless communication apparatuses connected via the base station 142. The MCIM (contract authentication information) is different from MCIM of the second communication operator.

Except for a managing communication operator and MCIM, the communication control apparatus (third communication operator) 140 and the base station 142 are approximately the same as the communication control apparatus (second communication operator) 130 and the base station 132, and thus description will be omitted here.

In the second embodiment of the present technology, description will be made of an example of a case in which a user plays a desired game on an online game site. Specifically, an example in which a user selects a desired free evaluation version game on an online game site, and thereby plays the game using MCIM of the service providing company 50 (SP MCIM) providing the online game is shown.

Also, in the second embodiment of the present technology, it is assumed that MCIM for which a user himself/ herself has contracted is held in the wireless communication apparatus 300, and an online game site is browsed using the MCIM.

[Example of Display of Game Selecting Operation Screen and Game Ending Screen]

FIG. 10 is a diagram showing a display screen example displayed on the display unit 370 of the wireless communication apparatus 300 according to the second embodiment of the present technology.

Figure 10A:
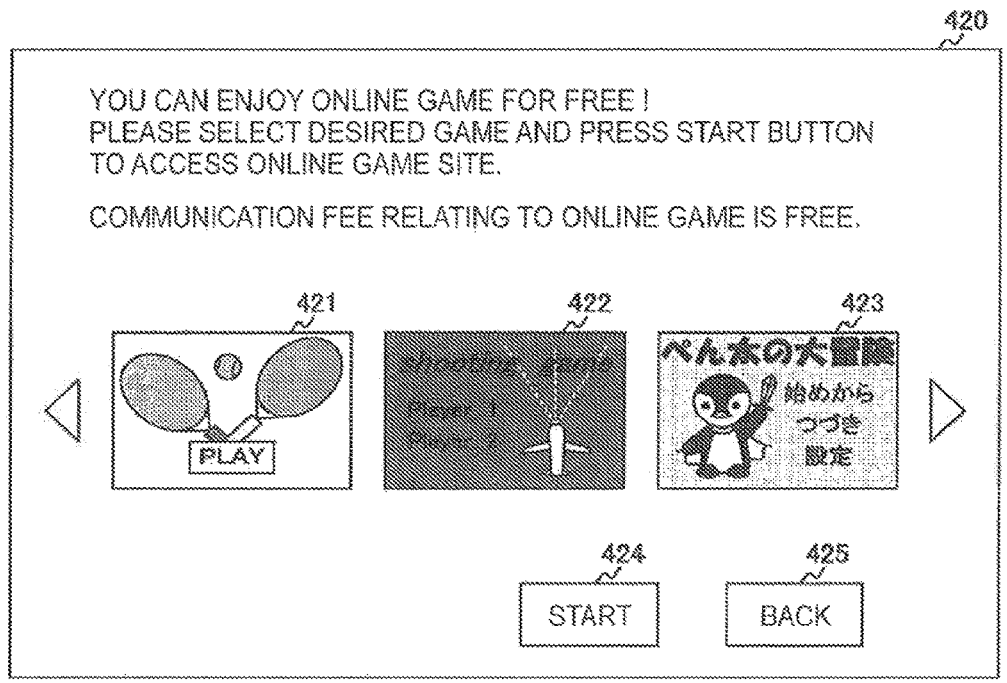
FIG. 10A shows a game selecting operation screen 420 of a case in which a communication service is performed between the wireless communication apparatus and the information processing apparatus 200.

FIG. 10A shows a game selecting operation screen 420 of a case in which a communication service is performed between the wireless communication apparatus and the information processing apparatus 200. This game selecting operation screen 420 is an example of an operation screen displayed, for example, while the wireless communication apparatus 300 is connected to an online game site provided by the service providing company 50.

In the game selecting operation screen 420, game icons 421 to 423, a start button 424, and a back button 425 are provided. For convenience of description, illustration and description of other information displayed in the game selecting operation screen 420 will be omitted.

The game icons 421 to 423 are icons representing online games provided by the service providing company 50. A user can select a desired online game by performing a selection operation of selecting these icons.

The start button 424 is a button pressed to start a selected online game after the selection operation of selecting any of the game icons 421 to 423 is performed.

The back button 425 is a button pressed, for example, to return to a display screen that has been displayed immediately before.

For example, the user of the wireless communication apparatus 300 causes the display unit 370 to display the game selecting operation screen 420, selects a desired game icon through an operation input to the operation unit 360, and performs a pressing operation on the start button 424. When this pressing operation is received, the control unit 330 controls SP MCIM to be set. This processing will be described in detail with reference to FIG. 11 and FIG. 12.

Figure 10B:
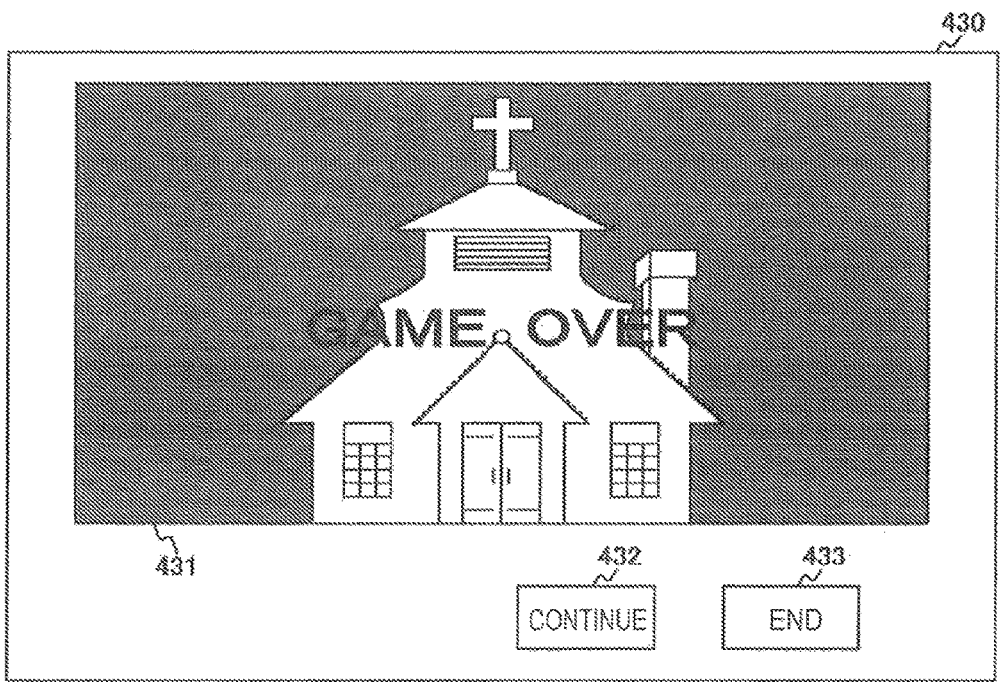
FIG. 10B shows a game ending screen 430 for ending use of a communication service (online game) performed between the wireless communication apparatus and the information processing apparatus 200.

FIG. 10B shows a game ending screen 430 for ending use of a communication service (online game) performed between the wireless communication apparatus and the information processing apparatus 200. This game ending screen 430 is displayed on the display unit 370, for example, when the online game selected by the user on the game selecting operation screen 420 shown in FIG. 10A has ended.

In the game ending screen 430, a screen 431 corresponding to a time at which the online game selected by the user ends, a continue button 432, and an end button 433 are provided. For convenience of description, illustration and description of other information displayed in the game ending screen 430 will be omitted.

The continue button 432 is a button pressed to continuously play the online game that has ended. In addition, a limitation may be imposed on the number of times that the online game can be played after the end of the game (for example, three times), and the continue button 432 may not be displayed when the limited number of times is satisfied.

The end button 433 is a button pressed to confirm the end of the online game. When the end button 433 is pressed, a display screen returns to an initial menu or the like.

For example, while the game ending screen 430 is displayed on the display unit 370, the user of the wireless communication apparatus 300 performs a pressing operation on the end button 433 through an operation input to the operation unit 360. When this pressing operation is received, the control unit 330 releases the SP MCIM and controls the original MCIM to be set. This processing will be described in detail with reference to FIG. 11 and FIG. 12.

[Communication Example in Case of Playing Online Game]

Figure 12:
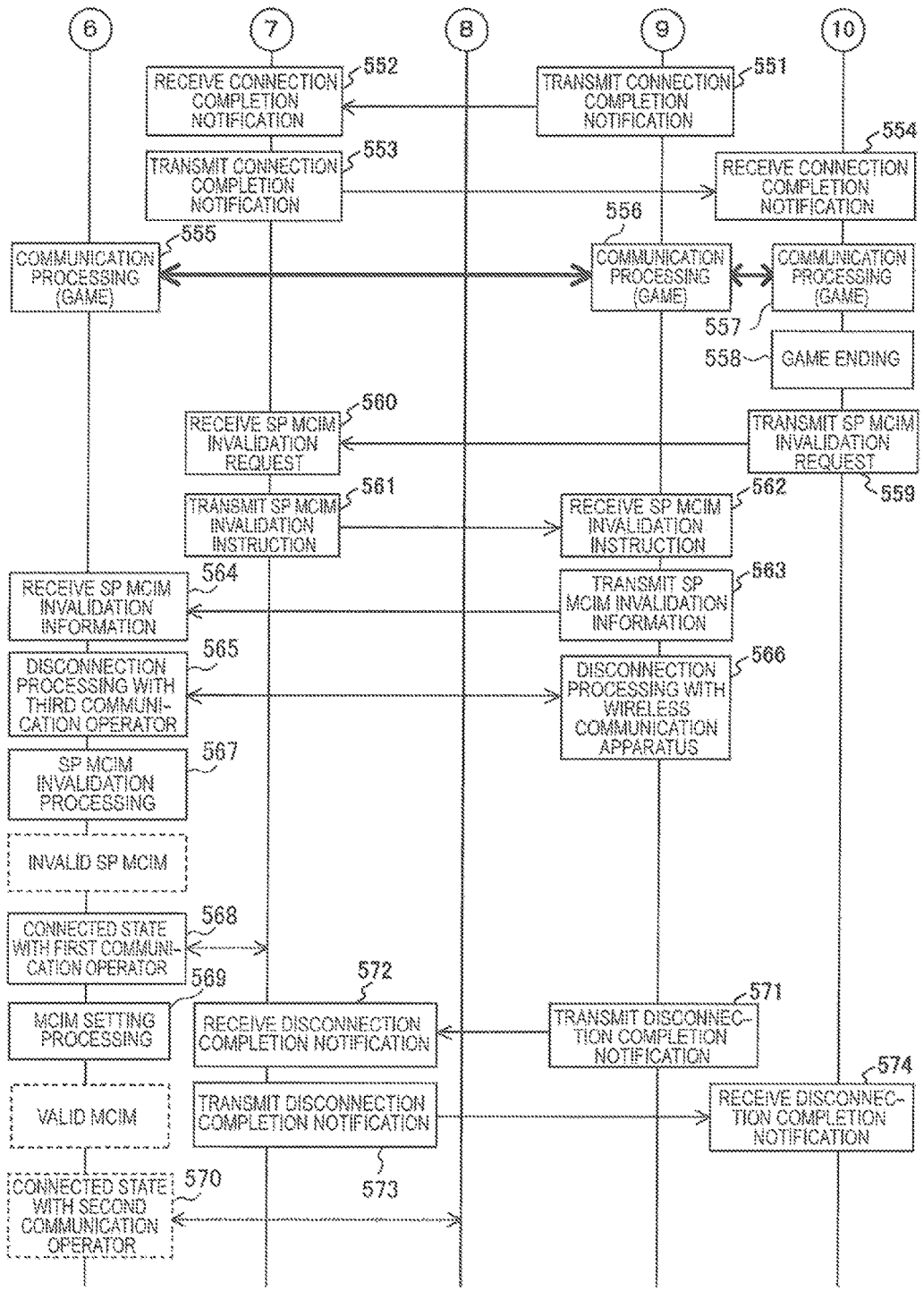
FIG. 12 is a sequence chart showing a communication processing example between respective apparatuses included in the communication system 101 according to the second embodiment of the present technology.

FIG. 11 and FIG. 12 are sequence charts showing a communication processing example between respective apparatuses included in the communication system 101 according to the second embodiment of the present technology.

In FIG. 11 and FIG. 12, description will be made of an example of connecting to a third communication operator using MCIM of the third communication operator (SP MCIM) when the wireless communication apparatus 300 is holding MCIM of a second communication operator (MCIM in accordance with a user contract). In other words, in FIG. 11 and FIG. 12, the wireless communication apparatus 300 is assumed to be in a connected state (531) with the communication control apparatus (second communication operator) 130. Here, the MCIM of the third communication operator is assumed to be MCIM (SP MCIM) contracted to the service providing company 50. Also, FIG. 11 and FIG. 12 show a communication processing example in the case of using a communication service (for example, an online game) provided from the information processing apparatus 200 by operating the wireless communication apparatus 300.

At first, by a user operation, the wireless communication apparatus 300 is connected to the information processing apparatus 200 via the communication control apparatus (second communication operator) 130, and performs communication processing with the information processing apparatus 200 (532 to 534). In other words, it becomes possible to use a communication service via the network (for example, the Internet) 110 (532 to 534).

While it is possible to use a communication service in this way, a display screen for performing a selection operation for selecting an online game based on a user operation is displayed on the display unit 370 of the wireless communication apparatus 300. For example, the game selecting operation screen 420 shown in FIG. 10A is displayed on the display unit 370.

In the game selecting operation screen 420 shown in FIG. 10A, a selection operation of the game icons 421 to 423 desired by the user is performed (535). In this way, when the game selecting operation is received in the wireless communication apparatus 300 (535), game selection information is transmitted from the wireless communication apparatus 300 to the information processing apparatus 200 (536 to 539). This game selection information is information for specifying a game selected through the selection operation by the user. Also, the game selection information includes identification information for identifying the wireless communication apparatus 300 and type information for specifying the type of a wireless communication apparatus (for example, a mobile phone apparatus). Since the wireless communication apparatus 300 is in the connected state (531) with the communication control apparatus (second communication operator) 130, the selection information is transmitted from the wireless communication apparatus 300 to the information processing apparatus 200 via the communication control apparatus (second communication operator) 130 (536 to 539).

When the game selection information is received (539), the control unit 250 of the information processing apparatus 200 transmits an SP MCIM setting request to the communication control apparatus (first communication operator) 120 (540 and 541). This SP MCIM setting request is a request for setting valid MCIM (the MCIM of the third communication operator (SP MCIM) contracted to the service providing company 50) for a wireless communication apparatus having transmitted game selection information (the wireless communication apparatus 300).

When the SP MCIM setting request is received (541), the control unit 121 of the communication control apparatus (first communication operator) 120 transmits an SP MCIM setting instruction to the communication control apparatus (third communication operator) 140 (542 and 543). This SP MCIM setting instruction is an instruction to set SP MCIM for a wireless communication apparatus (wireless communication apparatus 300).

When the MCIM setting instruction is received (543), the control unit 141 of the communication control apparatus (third communication operator) 140 transmits SP MCIM setting information to the wireless communication apparatus 300 via the communication control apparatus (first communication operator) 120 (544 to 547). This SP MCIM setting information is information for setting SP MCIM for the wireless communication apparatus 300, and includes the SP MCIM. In other words, in this example, SP MCIM is downloaded from the communication control apparatus (third communication operator) 140 to the wireless communication apparatus 300 via the communication control apparatus (first communication operator) 120. However, like in the first embodiment of the present technology, by causing the wireless communication apparatus 300 to hold SP MCIM and performing validation/invalidation of the held SP MCIM, the SP MCIM may be set for the wireless communication apparatus 300.

When the SP MCIM setting information is received by the wireless communication apparatus 300 (547), valid MCIM (SP MCIM) is set for the wireless communication apparatus 300 (548). Specifically, the downloaded SP MCIM is written in the MCIM information storage unit 350 of the wireless communication apparatus 300 (548). In this case, MCIM held in the MCIM information storage unit 350 (MCIM in accordance with a user contract) is invalidated. Accordingly, valid MCIM (SP MCIM) is held in the wireless communication apparatus 300, and the wireless communication apparatus 300 is put in a connected state (550) with the communication control apparatus (third communication operator) 140. In other words, the connection right to the communication control apparatus (third communication operator) 140 is set for the wireless communication apparatus 300. During this connection processing, like in the first embodiment of the present technology, the communication control apparatus (third communication operator) 140 may be notified of identification information on the wireless communication apparatus 300.

When the wireless communication apparatus 300 is put in the connected state (550) with the communication control apparatus (third communication operator) 140, the communication control apparatus (third communication operator) 140 transmits a connection completion notification to the communication control apparatus (first communication operator) 120 (551 and 552). This connection completion notification is information for providing a notification that the wireless communication apparatus 300 has been connected. When the connection completion notification is received (552), the control unit 121 of the communication control apparatus (first communication operator) 120 transmits the connection completion notification to the information processing apparatus 200 (553 and 554). Due to this connection completion notification, the information processing apparatus 200 can detect connection completion, and thus can start to provide the online game.

When the communication control apparatus (third communication operator) 140 is notified of the identification information on the wireless communication apparatus 300 during the connection processing described above (550), the communication control apparatus (first communication operator) 120 may be notified of them (551 and 552). In this case, the information processing apparatus 200 may be notified of the identification information on the wireless communication apparatus 300 in the same way (553 and 554). Accordingly, the communication control apparatus (first communication operator) 120 and the information processing apparatus 200 can easily detect that the connection between the communication control apparatus (third communication operator) 140 and the wireless communication apparatus 300 has been completed.

Here, the wireless communication apparatus 300 is in the connected state (550) with the communication control apparatus (third communication operator) 140. For this reason, the wireless communication apparatus 300 can connect to the information processing apparatus 200 via the communication control apparatus (third communication operator) 140, and perform communication processing with the information processing apparatus 200 (555 to 557). In other words, it becomes possible to use a communication service (online game) via the network (for example, the Internet) 110 (555 to 557).

In other words, a game screen for playing the online game corresponding to the game icon selected in the game selecting operation screen 420 shown in FIG. 10A is displayed on the display unit 370 (555 to 557). Then, the user of the wireless communication apparatus 300 can play the desired game in the game screen (555 to 557).

Here, a case of ending a communication service (online game) that is being performed through a connection based on SP MCIM is described. For example, as an end timing of an online game, it is possible to set a case in which the game is played up to a previously provided screen, a case in which a fixed time (for example, one hour) elapses after the start of the game, a case in which game play is stopped by a manual operation of a user, and the like. These end timings of an online game are determined by the determination unit 240 of the information processing apparatus 200.

When it is an end timing of the online game as above, the wireless communication apparatus 300 may automatically perform disconnection processing based on an instruction from the control unit 250 of the information processing apparatus 200. For example, when it is determined that it is an end timing of the online game, game ending may be determined on condition that an ending operation is performed by the user. For example, when it is determined that it is an end timing of the online game, the game ending screen 430 shown in FIG. 10B is caused to be displayed on the display unit 370. Then, on condition that a pressing operation on the end button 533 is performed by the user in the game ending screen 430, game ending may be determined.

Therefore, when game ending is determined by the determination unit 240 of the information processing apparatus 200 (558), an SP MCIM invalidation request is transmitted from the information processing apparatus 200 to the communication control apparatus (first communication operator) 120 (559 and 560). The SP MCIM invalidation request is a request for invalidating the SP MCIM set for the wireless communication apparatus 300.

When the SP invalidation request is received (560), the control unit 121 of the communication control apparatus (first communication operator) 120 transmits an SP MCIM invalidation instruction to the communication control apparatus (third communication operator) 140 (561 and 562). This SP MCIM invalidation instruction is an instruction to invalidate the SP MCIM set for the wireless communication apparatus 300.

When the SP MCIM invalidation instruction is received (562), the control unit 141 of the communication control apparatus (third communication operator) 140 transmits MCIM invalidation information to the wireless communication apparatus 300 (563 and 564). This MCIM invalidation information is information for invalidating (erasing) the SP MCIM set for the wireless communication apparatus 300. In other words, in this example, the SP MCIM set for the wireless communication apparatus 300 is erased and thereby invalidated. However, by causing the wireless communication apparatus 300 to hold SP MCIM and performing validation/invalidation of the held SP MCIM, the SP MCIM set for the wireless communication apparatus 300 may be invalidated. In this case, the MCIM invalidation information includes information for invalidating the SP MCIM held in the wireless communication apparatus 300.

When the wireless communication apparatus 300 receives the SP MCIM invalidation information (564), disconnection processing is performed between the wireless communication apparatus 300 and the communication control apparatus (third communication operator) 140 (565 and 566). After this disconnection processing is performed (565 and 566), MCIM invalidation processing is performed in the wireless communication apparatus 300 (567). In other words, the MCIM (SP MCIM) written in the MCIM information storage unit 350 is erased (567). Accordingly, the wireless communication apparatus 300 is put in a connected state (568) with the communication control apparatus (first communication operator) 120.

Subsequently, valid MCIM (MCIM in accordance with a user contract) is set for the wireless communication apparatus 300 (569). Specifically, MCIM (MCIM in accordance with a user contract) held in the MCIM information storage unit 350 of the wireless communication apparatus 300 is validated (569). Accordingly, valid MCIM is held in the wireless communication apparatus 300, and the wireless communication apparatus 300 is put in a connected state (570) with the communication control apparatus (second communication operator) 130. In other words, the connection right to the communication control apparatus (second communication operator) 130 is set for the wireless communication apparatus 300.

After the disconnection processing is performed (565 and 566), the communication control apparatus (third communication operator) 140 transmits a disconnection completion notification that the connection with the wireless communication apparatus 300 has been disconnected to the communication control apparatus (first communication operator) 120 (571 and 572). When the communication control apparatus (first communication operator) 120 receives the disconnection completion notification (572), the communication control apparatus (first communication operator) 120 transmits the disconnection completion notification to the information processing apparatus 200 (573 and 574).

As above, when a predetermined operation (for example, a game selecting operation) is received in the wireless communication apparatus 300, the determination unit 240 determines that a predetermined condition is satisfied.

In addition, when the predetermined condition is satisfied, the control unit 250 makes an SP MCIM setting request for setting a connection right for the wireless communication apparatus 300 to the communication control apparatus (first communication operator) 120. Then, based on the connection right set for the wireless communication apparatus 300 by the communication control apparatus (second communication operator) 130 according to the setting request, the wireless communication apparatus 300 is connected to the network 110 and then controls communication processing to be performed between the information processing apparatus 200 and the wireless communication apparatus 300.

Further, when the determination unit 240 determines that a predetermined condition for invalidation is satisfied, the control unit 250 controls an invalidation request for invalidating a connection right set for the wireless communication apparatus 300 to be made to the communication control apparatus (first communication operator) 120.

Like in the first embodiment of the present technology, the transmission of each notification (a connection completion notification and a disconnection completion notification) may be omitted.

Consequently, in the second embodiment of the present technology, SP MCIM can be set for the wireless communication apparatus 300 based on a setting request from the side of the service providing company 50. In this case, the side of the service providing company 50 becomes an SP MCIM setting request side, and thus can easily manage information indicating how many wireless communication apparatuses are currently given SP MCIM and the like, and the states thereof. For example, in an online game, a fixed amount of communication occurs while a user uses the service, and thus it is important for the side of the service providing company 50 to manage the number of pieces of connected equipment and the like.

[Operational Example of Information Processing Apparatus]

Figure 13:
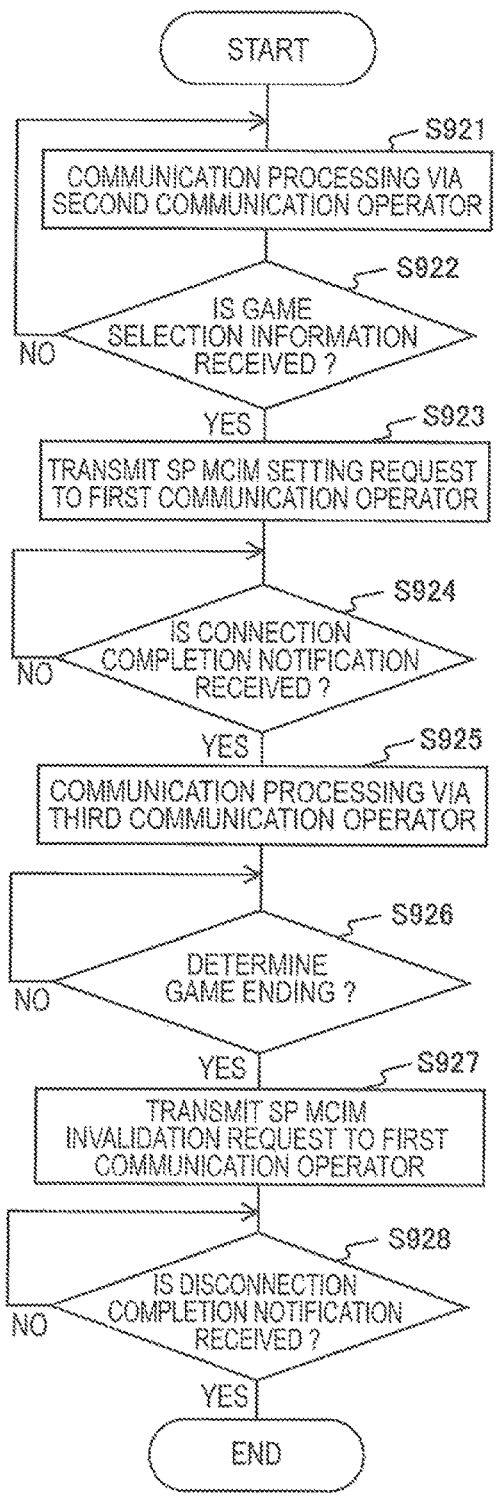
FIG. 13 is a flow chart showing an example of the processing procedure for communication processing by the information processing apparatus 200 according to the second embodiment of the present technology.

FIG. 13 is a flow chart showing an example of the processing procedure for communication processing by the information processing apparatus 200 according to the second embodiment of the present technology.

At first, communication processing (for example, a game selecting operation) is performed between the information processing apparatus 200 and the wireless communication apparatus 300 via the communication control apparatus (second communication operator) 130 (step S921).

Subsequently, the control unit 250 decides whether or not game selection information has been received (step S922), and the process returns to step S921 when no game selection information has been received. On the other hand, when game selection information has been received (step S922), the control unit 250 transmits an SP MCIM setting request to the communication control apparatus (first communication operator) 120 (step S923). Here, step S922 is an example of a determination procedure described in the claims.

Subsequently, the control unit 250 decides whether or not a connection completion notification has been received (step S924), and continues monitoring when no connection completion notification has been received. On the other hand, when a connection completion notification has been received (step S924), the information processing apparatus 200 is put in a connected state with the wireless communication apparatus 300 via the communication control apparatus (third communication operator) 140. For this reason, the control unit 250 performs communication processing with the information processing apparatus 200 via the communication control apparatus (third communication operator) 140 (step S925).

Subsequently, the control unit 250 decides whether or not game ending has been determined by the determination unit 240 (step S926), and continues monitoring when game ending has been determined. On the other hand, when game ending has been determined (step S926), the control unit 250 transmits an SP MCIM invalidation request to the communication control apparatus (first communication operator) 120 (step S927).

Subsequently, the control unit 250 decides whether or not a disconnection completion notification has been received (step S928), and continues monitoring when no disconnection completion notification has been received. On the other hand, when disconnection completion notification has been received (step S928), the communication processing operation is ended. Here, steps S923 to S928 are an example of a control procedure described in the claims.

3. Modified Example

As described above, an RO and an SHO are logical roles, and each of the RO and the SHO may be operated by the same communication operator. In this case, the communication operator generates two kinds of contract authentication information other than PCID and MCIM, and thereby can realize the same mechanisms as the first and second embodiments of the present technology.

As the contract authentication information other than PCID and MCIM, the communication operator is assumed to generate, for example, two kinds of IMSI (International Mobile Subscriber Identify). Here, description will be made by referring to the two kinds of IMSI as first IMSI and second IMSI.

The first IMSI is assumed to be, for example, contract authentication information for a connection for exchanging limited information, and the second IMSI is assumed to be contract authentication information for performing general communication.

In this case, the first IMSI corresponds to PCID, and the second IMSI corresponds to MCIM. Also, a wireless communication apparatus is assumed to have held the first IMSI in advance. Then, using the held first IMSI, it is possible to connect to a communication operator and acquire the second IMSI.

Therefore, in this embodiment of the present technology, a user can download (or validate) contract authentication information contracted to a service provider and easily acquire a network connection right using the contract authentication information. However, this example is not limited to the configuration of a communication system described above (for example, see Non-Patent Literature 1), and can be applied to other communication systems.

Embodiments of the present technology have been described with an example of integrally constituted information processing apparatuses (the communication control apparatuses 120 and 130, the information processing apparatus 200, and the like). However, the embodiments of the present technology can also be applied to an information processing system in which respective parts of these information processing apparatuses (for example, the control unit 250 and the determination unit 240) are constituted of a plurality of apparatuses.

In addition, the embodiments of the present technology can be applied to portable wireless communication apparatuses (for example, a terminal apparatus dedicated to data communication) and fixed wireless communication apparatuses. For example, the embodiments of the present technology can be applied to wireless communication apparatuses intended to collect data of vending machines, and wireless communication apparatuses installed in elevators, automobiles, and electronics (for example, home appliances, game machines, digital photo frames).

Further, the embodiments of the present technology have been described by taking, as network connection rights (connection rights), rights of using MCIM as an example. However, the embodiments of the present technology can also be applied to connection rights to connect to a predetermined network based on other information (for example, USIM (Universal Subscriber Identity Module)).

Consequently, according to the embodiments of the present technology, a mechanism in which a service provider pays for the communication fee of a user can be implemented using a software-downloadable SIM. In other words, when a communication service provided by a service provider is received, a user downloads MCIM contracted to the service provider and thereby can use communication services of the service provider at no cost.

Also, the above-described embodiments are intended only to show examples realizing the present technology, and matters according to the embodiments and specific inventive matters within the scope of claims have a correspondence relation. Likewise, specific inventive matters within the scope of claims, and matters according to the embodiments of the present technology, to which the same names as the specific inventive matters are assigned, have a correspondence relation. However, the present technology is not limited to the embodiments, and the embodiments may also be modified in various forms without departing from the scope and spirit of the present technology.

Also, the processing procedures described in the above-mentioned embodiments may be methods including a series of these steps, and may also include a program for executing a series of these steps on a computer or a recording medium storing the program. As the recording medium, for example, a Compact Disc (CD), Minidisc (MD), a Digital Versatile Disc (DVD), a memory card, a Blu-ray Disc (trademark), or the like may be used.

Additionally, the present technology may also be configured as below.

(1) An information processing apparatus including:

a determination unit which determines whether a predetermined condition for performing communication processing between an information processing system relating to a service provider and a wireless communication apparatus is satisfied; and a control unit which sets a connection right to connect to a predetermined network using wireless communication for the wireless communication apparatus, and performs control in a manner that the wireless communication apparatus connects to the network based on the set connection right and performs the communication processing with the information processing system, when the predetermined condition is satisfied.

(2) The information processing apparatus according to (1), wherein the information processing apparatus is the wireless communication apparatus, wherein the determination unit determines that the predetermined condition is satisfied, when a predetermined operation is received by an operation unit, and wherein, when the predetermined condition is satisfied, the control unit makes a setting request for setting the connection right for the wireless communication apparatus to an RO (Registration Operator) and performs control in a manner that the wireless communication apparatus connects to the network based on the connection right set by an SHO (Selected Home Operator) according to the setting request and then performs the communication processing with the information processing system.

(3) The information processing apparatus according to (2), wherein, when the connection right is set for the wireless communication apparatus and the wireless communication apparatus is connected to the network, the RO notifies the information processing system of that.

(4) The information processing apparatus according to (2) or (3), wherein, when the connection right set for the wireless communication apparatus is invalidated, the RO notifies the information processing system of that.

(5) The information processing apparatus according to (1), wherein the information processing apparatus is the information processing system, wherein the determination unit determines whether the predetermined condition is satisfied, when a predetermined operation is received in the wireless communication apparatus, and wherein, when the predetermined condition is satisfied, the control unit makes a setting request for setting the connection right for the wireless communication apparatus to an RO and performs control in a manner that the communication processing is performed between the wireless communication apparatus and the information processing system after the wireless communication apparatus is connected to the network based on the connection right set for the wireless communication apparatus by an SHO according to the setting request.

(6) The information processing apparatus according to any one of (1) to (5), wherein the connection right is a right to connect to a base station operated by a communication operator with which the service provider has a contract based on contract authentication information for connecting to the base station.

(7) The information processing apparatus according to any one of (1) to (6), wherein a limitation for performing only the communication processing between the information processing system and the wireless communication apparatus is imposed on the connection right.

(8) The information processing apparatus according to any one of (1) to (7), wherein the control unit performs control for performing, as the communication processing, content provision processing of providing content from the information processing system to the wireless communication apparatus, upload processing of uploading content from the wireless communication apparatus to the information processing system, or download processing of downloading content from the information processing system to the wireless communication apparatus.

(9) The information processing apparatus according to any one of (1) to (8), wherein the determination unit determines whether a predetermined condition for invalidating the set connection right is satisfied, and wherein, when it is determined that the predetermined condition for invalidation is satisfied, the control unit performs control for invalidating the connection right set for the wireless communication apparatus.

(10) The information processing apparatus according to (9), wherein the information processing apparatus is the information processing system, and wherein, when it is determined that the predetermined condition for invalidation is satisfied, the control unit performs control in a manner that an invalidation request for invalidating the connection right set for the wireless communication apparatus is made to an RO.

(11) The information processing apparatus according to any one of (1) to (10), wherein, when the communication processing performed between the information processing system and the wireless communication apparatus ends, the control unit performs control in a manner that invalidation processing for invalidating the connection right set for the wireless communication apparatus is performed.

(12) A communication system including:

an information processing system relating to a service provider;

a wireless communication apparatus which performs wireless communication;

a determination unit which determines whether a predetermined condition for performing communication processing between the information processing system and the wireless communication apparatus is satisfied; and a control unit which sets a connection right to connect to a predetermined network using wireless communication for the wireless communication apparatus, and performs control in a manner that the wireless communication apparatus connects to the network based on the set connection right and performs the communication processing with the information processing system, when the predetermined condition is satisfied.

(13) A control method of an information processing apparatus, the control method including:

a determination procedure of determining whether a predetermined condition for performing communication processing between an information processing system relating to a service provider and a wireless communication apparatus is satisfied; and a control procedure of setting a connection right to connect to a predetermined network using wireless communication for the wireless communication apparatus, and performing control in a manner that the wireless communication apparatus connects to the network based on the set connection right and performs the communication processing with the information processing system, when the predetermined condition is satisfied.

REFERENCE SIGNS LIST 10, 100, 101, 102 communication system
21, 31, 122, 132, 142 base station
40, 110 network
50 service providing company
120 communication control apparatus (first communication operator)
121, 131, 141, 250, 330 control unit
130 communication operator (second communication operator)
140 communication operator (third communication operator)
200 information processing apparatus
210 communication unit 220 service providing unit
230 storage unit
240 determination unit
300 wireless communication apparatus
311 antenna
312 antenna shared unit
321 modulation unit
322 demodulation unit
331 bus
340 memory
350 MCIM information storage unit
360 operation unit
370 display unit
380 position information acquisition unit
391 microphone
392 speaker

What is claimed is:

1. A wireless communication apparatus, comprising:
 circuitry configured to:
  determine a first condition is satisfied to execute a communication process with an information processing system,
  wherein the first condition is satisfied based on a user input, and
  wherein the information processing system is a service provider;
  receive a setting request, from a Registration Operator (RO), to set a connection right based on the first condition that is satisfied, wherein the setting request includes identification information to identify the wireless communication apparatus and type information to specify a type of the wireless communication apparatus;
  set the connection right to connect with a network via wireless communication based on the received setting request, wherein the set connection right corresponds to a right to access Machine Communication Identity Module (MCIM), wherein the wireless communication apparatus is connected to a first Selected Home Operator (SHO) based on the set connection right, wherein the first SHO transmits a connection complete notification to the RO, wherein the connection complete notification indicates a successful connection of the wireless communication apparatus with the first SHO, and wherein the RO transmits another connection complete notification to the information processing system;
  control connection with the network based on the set connection right; and
  control the communication process with the information processing system, to receive a plurality of communication services, based on the first condition that is satisfied and the connection of the wireless communication apparatus with the network.

2. The wireless communication apparatus according to claim 1, wherein information associated with the user input is transmitted to the information processing system via the first SHO.

3. The wireless communication apparatus according to claim 2, wherein the circuitry is further configured to:
 receive the setting request to set the connection right from the RO based on the transmission of the information associated with the user input via the first SHO, and the first condition that is satisfied, and
 set the connection right, to connect to the network via the wireless communication, based on setting information that is to set the connection right set by a second Selected Home Operator (SHO) and received via the RO.

4. The wireless communication apparatus according to claim 1, wherein the RO is configured to notify the information processing system of the set connection right and the connection of the wireless communication apparatus with the network based on the set connection right and the wireless communication apparatus that is connected to the network.

5. The wireless communication apparatus according to claim 1, wherein the RO notifies the information processing system of an invalidation of the set connection right for the wireless communication apparatus.

6. The wireless communication apparatus according to claim 1, wherein the connection right is a right to connect to a base station operated by a communication operator, and wherein the information processing system has a contract with the communication operator based on contract authentication information to connect to the base station.

7. The wireless communication apparatus according to claim 1, wherein the circuitry is further configured to impose on the connection right, a limitation to control the communication process with the information processing system.

8. The wireless communication apparatus according to claim 1, wherein the circuitry is further configured to one of download content from the information processing system or upload content to the information processing system during the communication process.

9. The wireless communication apparatus according to claim 1,
 wherein the circuitry is further configured to:
 determine a second condition to invalidate the set connection right is satisfied, and
 control invalidation of the set connection right based on the second condition for invalidation that is satisfied.

10. The wireless communication apparatus according to claim 1, wherein the circuitry is further configured to invalidate the set connection right based on a termination of the communication process with the information processing system.

11. The wireless communication apparatus according to claim 1, wherein the first condition is an operation to access a communication service of the plurality of communication services provided by the information processing system.

12. A control method, comprising:
 in a wireless communication apparatus:
 determining a condition is satisfied to execute a communication process with an information processing system,
 wherein the condition is satisfied based on a user input, and
 wherein the information processing system is a service provider;
 receiving a setting request, from a Registration Operator (RO), to set a connection right based on the condition that is satisfied, wherein the setting request includes identification information to identify the wireless communication apparatus and type information to specify a type of the wireless communication apparatus;
 setting the connection right to connect with a network via wireless communication based on the received setting request, wherein the set connection right corresponds to a right to access Machine Communication Identity Module (MCIM), wherein the wireless communication apparatus is connected to a first Selected Home Operator (SHO) based on the set connection right, wherein the first SHO transmits a connection complete notification to the RO, wherein the connection complete notification indicates a successful connection of the wireless communication apparatus with the first SHO, and wherein the RO transmits another connection complete notification to the information processing system;

controlling connection with the network based on the set connection right; and controlling the communication process with the information processing system, to receive a plurality of communication services, based on the condition that is satisfied and the connection of the wireless communication apparatus with the network.

13. A non-transitory computer-readable medium having stored thereon, computer-executable instructions which when executed by a wireless communication apparatus, cause the wireless communication apparatus to execute operations, the operations comprising:

determining a condition is satisfied to execute a communication process with an information processing system, wherein the condition is satisfied based on a user input, and wherein the information processing system is a service provider;

receiving a setting request, from a Registration Operator (RO), to set a connection right based on the condition that is satisfied, wherein the setting request includes identification information to identify the wireless communication apparatus and type information to specify a type of the wireless communication apparatus;

setting the connection right to connect with a network via wireless communication based on the received setting request, wherein the set connection right corresponds to a right to access Machine Communication Identity Module (MCIM), wherein the wireless communication apparatus is connected to a first Selected Home Operator (SHO) based on the set connection right, wherein the first SHO transmits a connection complete notification to the RO, wherein the connection complete notification indicates a successful connection of the wireless communication apparatus with the first SHO, and wherein the RO transmits another connection complete notification to the information processing system;

controlling connection with the network based on the set connection right; and controlling the communication process with the information processing system, to receive a plurality of communication services, based on the condition that is satisfied and the connection of the wireless communication apparatus with the network.

* * * * *